(12) United States Patent
Sekimoto

(10) Patent No.: US 10,348,968 B2
(45) Date of Patent: Jul. 9, 2019

(54) METHOD FOR PRODUCING CAMERA MODULE

(71) Applicant: SHARP KABUSHIKI KAISHA, Osaka-shi, Osaka (JP)

(72) Inventor: Yoshihiro Sekimoto, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 261 days.

(21) Appl. No.: 15/027,513

(22) PCT Filed: Aug. 5, 2014

(86) PCT No.: PCT/JP2014/070578
§ 371 (c)(1),
(2) Date: Apr. 6, 2016

(87) PCT Pub. No.: WO2015/052982
PCT Pub. Date: Apr. 16, 2015

(65) Prior Publication Data
US 2016/0255276 A1 Sep. 1, 2016

(30) Foreign Application Priority Data

Oct. 9, 2013 (JP) ................................ 2013-212097
Jun. 16, 2014 (JP) ................................ 2014-123603

(51) Int. Cl.
*H04N 5/225* (2006.01)
*G02B 7/04* (2006.01)
(Continued)

(52) U.S. Cl.
CPC .......... *H04N 5/23287* (2013.01); *G02B 7/02* (2013.01); *G02B 7/04* (2013.01); *G02B 7/08* (2013.01);
(Continued)

(58) Field of Classification Search
CPC ............ H04N 5/23287; H04N 5/2253; H04N 5/2254; H04N 5/2257; G02B 7/09;
(Continued)

(56) References Cited

U.S. PATENT DOCUMENTS

| 9,568,705 B2* | 2/2017 | Sekimoto ............... G02B 7/021 |
| 2009/0021624 A1* | 1/2009 | Westerweck ........... G03B 17/28 |
| | | 348/308 |

(Continued)

FOREIGN PATENT DOCUMENTS

| JP | 2010-097016 | 4/2010 |
| JP | 2012-088534 | 5/2012 |
| JP | 2012-256017 | 12/2012 |

OTHER PUBLICATIONS

International Search Report for PCT/JP2014/070578 dated Nov. 18, 2014, one page.

*Primary Examiner* — David P Bryant
*Assistant Examiner* — Lawrence Averick
(74) *Attorney, Agent, or Firm* — ScienBiziP, P.C.

(57) ABSTRACT

An optical section (3) and a lens holder (4) are fixed to each other in a state where the lens holder (4) is at an intermediate position within a movable range so that the optical section (3) does not come into contact with an image pickup section (10) in a case where the lens holder (4) is driven within the movable range. This makes it possible to provide (i) a camera module in which it is possible to reduce the influence of a tilt that occurs in the vicinity of an infinite-distance side mechanical end and also reduce the influence of a tilt that occurs at an intermediate position away from the infinite-distance side mechanical end and a macro side and in which image pickup lenses are attachable with high positional accuracy and (ii) a method for producing a camera module.

7 Claims, 29 Drawing Sheets

(51) Int. Cl.
  *H04N 5/232* (2006.01)
  *G02B 7/02* (2006.01)
  *G02B 7/08* (2006.01)
  *H02K 41/035* (2006.01)
  *G02B 7/09* (2006.01)
  *G02B 7/105* (2006.01)
  *G02B 27/64* (2006.01)
  *G03B 13/36* (2006.01)

(52) U.S. Cl.
  CPC ............... *G02B 7/09* (2013.01); *G02B 7/105* (2013.01); *G02B 27/646* (2013.01); *G03B 13/36* (2013.01); *H02K 41/0356* (2013.01); *H04N 5/2253* (2013.01); *H04N 5/2254* (2013.01); *H04N 5/2257* (2013.01)

(58) Field of Classification Search
  CPC ........ G02B 27/646; G02B 7/105; G02B 7/08; G02B 7/04; G02B 7/02; G03B 13/36; H02K 41/0356
  See application file for complete search history.

(56) References Cited

U.S. PATENT DOCUMENTS

| | | | |
|---|---|---|---|
| 2010/0097713 A1 | 4/2010 | Miura | |
| 2010/0110270 A1* | 5/2010 | Sekimoto | H04N 5/2254 348/340 |
| 2013/0314810 A1* | 11/2013 | Sekimoto | G02B 7/021 359/823 |

* cited by examiner

3: OPTICAL SECTION
5: LENS DRIVING DEVICE
10: IMAGE PICKUP SECTION
50: CAMERA MODULE

3: OPTICAL SECTION
5: LENS DRIVING DEVICE
10: IMAGE PICKUP SECTION
50: CAMERA MODULE

3: OPTICAL SECTION
5: LENS DRIVING DEVICE
21: DUMMY SENSOR COVER

3: OPTICAL SECTION
5: LENS DRIVING DEVICE
21: DUMMY SENSOR COVER

3: OPTICAL SECTION
5: LENS DRIVING DEVICE
10: IMAGE PICKUP SECTION
21: DUMMY SENSOR COVER

3: OPTICAL SECTION
5: LENS DRIVING DEVICE
10: IMAGE PICKUP SECTION
50: CAMERA MODULE

3: OPTICAL SECTION
5: LENS DRIVING DEVICE
10: IMAGE PICKUP SECTION
30: HEIGHT ADJUSTING DEVICE
50: CAMERA MODULE

| 3  | : OPTICAL SECTION |
| 5a | : LENS DRIVING DEVICE |
| 10 | : IMAGE PICKUP SECTION |
| 60 | : CAMERA MODULE |

| 3 : OPTICAL SECTION |
| 5b: LENS DRIVING DEVICE |
| 10a: IMAGE PICKUP SECTION |
| 70 : CAMERA MODULE |

3 : OPTICAL SECTION
5b: LENS DRIVING DEVICE
21 : DUMMY SENSOR COVER

3 : OPTICAL SECTION
5b: LENS DRIVING DEVICE
21 : DUMMY SENSOR COVER

3 : OPTICAL SECTION
5b: LENS DRIVING DEVICE
21 : DUMMY SENSOR COVER

3 : OPTICAL SECTION
5b: LENS DRIVING DEVICE
10a: IMAGE PICKUP SECTION
70 : CAMERA MODULE

| 3 : OPTICAL SECTION |
| 5c: LENS DRIVING DEVICE |
| 10b: IMAGE PICKUP SECTION |
| 80 : CAMERA MODULE |

3 : OPTICAL SECTION
5c: LENS DRIVING DEVICE
81 : BASE
82 : DUMMY SENSOR COVER

3 : OPTICAL SECTION
5b: LENS DRIVING DEVICE
10a: IMAGE PICKUP SECTION
90 : CAMERA MODULE

| 3 : OPTICAL SECTION |
| 5b: LENS DRIVING DEVICE |
| 10a: IMAGE PICKUP SECTION |
| 100 : CAMERA MODULE |

5b: LENS DRIVING DEVICE
10a: IMAGE PICKUP SECTION
100: CAMERA MODULE

5b: LENS DRIVING DEVICE
10a: IMAGE PICKUP SECTION
100 : CAMERA MODULE

| 3 : OPTICAL SECTION |
| 5b: LENS DRIVING DEVICE |
| 10a: IMAGE PICKUP SECTION |
| 100 : CAMERA MODULE |

3 : OPTICAL SECTION
5b: LENS DRIVING DEVICE
21 : DUMMY SENSOR COVER
100 : CAMERA MODULE

METHOD FOR PRODUCING CAMERA MODULE

This application is the U.S. national phase of International Application No. PCT/JP2014/070578 filed 5 Aug. 2014 which designated the U.S. and claims priority to JP Patent Application No. 2013-212097 filed 9 Oct. 2013 and JP Patent Application No. 2014-123603 filed 16 Jun. 2014, the entire contents of each of which are hereby incorporated by reference.

TECHNICAL FIELD

The present invention relates to (i) a camera module having an autofocus function and an image stabilizer function and mounted in an electronic device such as a mobile telephone and (ii) a method for producing a camera module. In particular, the present invention relates to (i) a camera module for which a focus adjustment is not carried out with use of screws and in which the influence of a tilt is reduced which tilt occurs in the vicinity of the mechanical end on the infinite-distance side and (ii) a method for producing a camera module.

BACKGROUND ART

On the recent mobile telephone market, models of mobile telephones having built-in camera modules have been becoming dominant. These camera modules need to be embedded in the mobile telephones. Therefore, the camera modules face greater demands for being compact and lightweight, as compared with camera modules to be embedded in digital cameras.

Among such camera modules, there have been an increasing number of camera modules that (i) achieve their autofocus (AF) functions with the use of lens drive devices and (ii) are mounted on electronic devices such as mobile telephones. Various types of lens drive devices have been developed so far, and examples of the lens drive devices encompass those employing stepper motors, those employing piezoelectric sensors, and those employing voice coil motors (VCM). Such lens drive devices have already been distributed on the market.

Further, mobile telephones have started to include a camera module having an optical image stabilizer (OIS) function. The OIS function is in wide public use in the field of digital cameras and video cameras. For mobile telephones, a size-related problem and the like have delayed the adoption of the OIS function until recent years.

Patent Literature 1 discloses an example lens driving device for an autofocus function. Specifically, the lens driving device disclosed in Patent Literature 1 is configured such that in a state where a current is not flown through a coil, a lens support is at an intermediate position between an infinity position and a maximum close position (macro). This configuration can reduce the distance of movement to a target position, and also reduce power consumption.

In a case where lenses are fixed to a lens driving device in a camera module having an AF function, failing to properly set an initial position for the lenses with respect to an image pickup element in an optical axis direction causes defocusing, with the result of an out-of-focus image.

In view of that, the mainstream of conventional AF camera modules has a mechanism in which (i) a screw structure is provided for each of a lens barrel (that is, a casing containing an assembly of a plurality of lenses) and a lens holder and in which (ii) the position of the lenses is adjusted along the optical axis with use of the screw structures.

A focus adjustment mechanism involving the use of screws, however, poses various problems: For example, torque management for the screws is troublesome, and an optical tilt is undesirably increased depending on the accuracy of members including the screws. In view of this, Patent Literature 2 proposes a focus adjustment mechanism not involving use of screws.

Patent Literature 2 discloses a focus adjustment mechanism in which (i) no screw structure is provided between a lens barrel and a lens holder for a focus position adjustment and in which (ii) the lens barrel is slidable until it is fixed to the lens holder. With this structure, the lens barrel is positioned with respect to the lens holder with use of a jig, and is fixed to the lens holder. There is a slight gap between the lens holder and the lens barrel. With this gap, the tilt of the lens barrel is less likely influenced by the tilt of the lens holder. This configuration allows the lens barrel to be positioned with respect to the lens holder and fixed to the lens holder with the accuracy of the jig and with a low tilt.

CITATION LIST

Patent Literature 1
Japanese Patent Application Publication, Tokukai, No. 2012-88534 A (Publication Date: May 10, 2012)
Patent Literature 2
Japanese Patent Application Publication, Tokukai, No. 2012-256017 A (Publication Date: Dec. 27, 2012)

SUMMARY OF INVENTION

Technical Problem

A typical camera module with an AF function is, however, frequently configured such that in a state where the lens driving device is not operated, that is, a current is not flown through the lens driving device (for example, the coil mentioned above), force is applied so that the movable section (lens holder) is at the movability limit (mechanical end; a reference position within a displaceable range on the side of the image pickup element) of the lens driving device on the infinite-distance side. This structure is the mainstream particularly for a lens driving device, such as a VCM, that includes a spring as a support section. Even without use of a spring as a support section, in a case where the movable section is pressed against the mechanical end due to gravity or is adjusted for a focusing operation with use of a screw, the screw mechanism frequently applies a pressure to the movable section so that the movable section is pressed against the mechanical end.

In a case where a focus adjustment mechanism such as that disclosed in Patent Literature 2 is used in a state where the lens holder is at the mechanical end as described above, the tilt of the lens barrel is less likely influenced by the tilt of the lens holder. This configuration allows the lens barrel to be positioned and fixed with the accuracy of the jig. However, even in a case where the lens barrel has been fixed to the lens holder through such a method, the lens barrel frequently becomes tilted as soon as the lens holder starts to move away from the mechanical end.

FIG. 22 shows an example stroke characteristic for such a phenomenon. FIG. 22 shows a relationship between current and stroke for a typical VCM. The lean of the stroke changes in two stages depending on the current value as indicated in the region of a stroke lean A and the region of a stroke lean B. This phenomenon is herein referred to as "two-stage activation".

In FIG. 28, the region of the stroke lean A indicates not a state where the lens holder is entirely lifted off from the mechanical end but a state where the lens holder is lifted only partially. The description below deals with this state in detail with reference to FIG. 29. FIG. 29 is a central cross-sectional view of a typical camera module 101, the view illustrating a state of a stroke in the vicinity of the boundary between the region of the stroke lean A and the region of the stroke lean B in FIG. 28.

A lens holder 104 to which a lens barrel 103 containing image pickup lenses 102 is fixed receives force due to electromagnetic force acting between a coil 105 and a magnet 106, the received force acting in such a direction as to lift the lens holder 104 off from a base 107 as illustrated in FIG. 29. However, variations in members included in the camera module 101 or in the accuracy of assembly of the members cause unbalance in the force by which the lens holder 104 is lifted or in the force of springs 108a and 108b for pressing the lens holder 104 against the base 107. Thus, while the current is small, only one side of the lens holder 104 (in FIG. 29, the left side) is lifted off from the base 107, so that a void 109 occurs and the other side of the lens holder 104 remains in contact with the base 107.

As described above, a tilt likely occurs in the vicinity of the infinite-distance side mechanical end of a lens holder and a lens barrel fixed to the lens holder. This tilt occurs after the lens holder starts to move. Thus, fixing the lens barrel to the lens holder with the accuracy of a jig as in Patent Literature 2 does not correct the tilt. Basically, in a state where the lens holder is pressed against the mechanical end on the infinite-distance side by means of a spring or gravity, the accuracy of members such as the lens holder and the base undesirably determines the tilt of the lens barrel. Thus, the tilt of the lens barrel in this state frequently differs from the tilt of the lens barrel in a state where the lens holder is driven. This makes it difficult to reduce the tilt of the lens barrel with high accuracy.

Adopting a structure such as that disclosed in Patent Literature 1 allows the lens holder to be lifted off from the mechanical end on the infinite-distance side and thus prevents the lens holder from being influenced by a tilt at the mechanical end. Patent Literature 1, however, fails to disclose or suggest a method for adjusting the initial position of the lens barrel.

This indicates that adopting, for example, an adjusting method involving the use of screws such as the method disclosed in the Examples of Patent Literature 1 fails to correct a tilt of the lens holder when the lens barrel is fixed which tilt occurs in a state where the lens holder is neutrally lifted by means of a spring. In other words, in a case where an adjusting method is adopted that involves the use of screws as above, the lens barrel has the accuracy of the hole of the lens holder (that is, the lens barrel is influenced by the accuracy of the hole of the lens holder), and it is thus impossible to correct a tilt of the lens holder when the lens barrel is fixed which tilt occurs in the state where the lens holder is neutrally lifted by means of a spring.

In a case where a focus position adjustment is carried out with use of screws for a lens holder neutrally lifted by means of a spring, in the first place, the screwing force acts on movable sections (namely, a lens holder and a lens barrel) and deforms the spring. Thus, removing this force after completion of the focus position adjustment immediately causes the spring to return to its original shape and undesirably moves the lenses along the optical axis from the position as adjusted. This means that an increased tilt of each the lens holder and the lens barrel results in a poorer accuracy of position adjustment.

The present invention has been accomplished in view of the above problem with conventional techniques. It is an object of the present invention to provide a method for producing a camera module in which it is possible to reduce the influence of a tilt of a lens holder which tilt occurs in the vicinity of an infinite-distance side mechanical end and also reduce the influence of a tilt of the lens holder which tilt occurs at an intermediate position away from the infinite-distance side mechanical end and a macro side and in which image pickup lenses are attachable with high positional accuracy.

Solution to Problem

In order to solve the above problem, a method of the present invention for producing a camera module is a method for producing a camera module, the camera module including: an optical section including a plurality of image pickup lenses; a lens driving device including: a lens holder configured to hold the optical section; and a movable range limiting section configured to limit a movable range for the lens holder on an infinite-distance side and a macro side, the lens driving device being configured to drive the optical section and the lens holder integrally at least along an optical axis of the plurality of image pickup lenses; and an image pickup section including an image pickup element, the image pickup section being disposed on the infinite-distance side of the optical section and the lens driving device, the method including: a first step of positioning the optical section with respect to the lens holder with use of a jig while sliding the optical section on the lens holder in a state where the lens holder is at an intermediate position within the movable range; and a second step of fixing the optical section to the lens holder at a position at which the optical section has been positioned through the first step.

With the above method, the optical section is positioned with respect to the lens holder in a state where the lens holder is at an intermediate position within the movable range (that is, a position within the above movable range at which position the lens holder is away from the movable range limit position on the infinite-distance side and that on the macro side). This makes it possible to reduce the influence of a tilt in the vicinity of the infinite-distance side mechanical end.

With the above method, in the state where the optical section is at the intermediate position, the optical section is positioned and fixed with use of a jig while the optical section is being slid on the lens holder. Thus, even in a case where the lens holder at the intermediate position is tilted, the optical section can be positioned with the accuracy of a jig without being influenced by the tilt. This makes it possible to reduce the influence of a tilt of the lens holder at an intermediate position away from the infinite-distance side mechanical end and the macro side.

In order to solve the above problem, a method of the present invention for producing a camera module is a method for producing a camera module, the camera module including: an optical section including a plurality of image pickup lenses; a lens driving device including: a lens holder configured to hold the optical section; and a movable range limiting section configured to limit a movable range for the lens holder on an infinite-distance side and a macro side, the lens driving device being configured to drive the optical section and the lens holder integrally at least along an optical axis of the plurality of image pickup lenses; and an image pickup section including an image pickup element, the image pickup section being disposed on the infinite-distance side of the optical section and the lens driving device, the method including: a first step of positioning the optical section with respect to the lens holder by causing the optical section to abut on either a fixing section of the lens driving device or part of the image pickup section in a state where the lens holder is at an intermediate position within the movable range; and a second step of fixing the optical section to the lens holder at a position at which the optical section has been positioned through the first step.

With the above method, even in a case where the optical section is positioned not with use of a jig but by being caused to abut on the lens driving device or part of the image pickup section, the optical section is positioned with respect to the lens holder in the state where the lens holder is at an intermediate position within the movable range (that is, a position within the above movable range at which position the lens holder is away from the movable range limit position on the infinite-distance side and that on the macro side). This makes it possible to reduce the influence of a tilt in the vicinity of the infinite-distance side mechanical end.

The camera module is a camera module including: an optical section including a plurality of image pickup lenses; a lens driving device including: a lens holder configured to hold the optical section; and a movable range limiting section configured to limit a movable range for the lens holder on an infinite-distance side and a macro side, the lens driving device being configured to drive the optical section and the lens holder integrally at least along an optical axis of the plurality of image pickup lenses; and an image pickup section including an image pickup element, the image pickup section being disposed on the infinite-distance side of the optical section and the lens driving device, the optical section being fixed to the lens holder in a state where the lens holder is at an intermediate position within the movable range.

With the above configuration, the optical section is fixed to the lens holder in a state where the lens holder is at an intermediate position within the movable range. This makes it possible to reduce the influence of a tilt in the vicinity of the infinite-distance side mechanical end.

The optical section is fixed to the lens holder so that the lens holder will not come into contact with the image pickup section in a case where the lens holder is driven within the movable range. In other words, since the optical section is positioned with respect to the image pickup section and fixed to the image pickup section, it is possible to reduce the influence of a tilt of the lens holder at an intermediate position away from the infinite-distance side mechanical end and the macro side.

Advantageous Effects of Invention

A method of the present invention for producing a camera module can provide a method for producing a camera module in which it is possible to reduce the influence of a tilt of a lens holder which tilt occurs in the vicinity of an infinite-distance side mechanical end and also reduce the influence of a tilt of the lens holder which tilt occurs at an intermediate position away from the infinite-distance side mechanical end and a macro side and in which image pickup lenses are attachable with high positional accuracy.

DESCRIPTION OF EMBODIMENTS

The description below deals with embodiments of the present invention in detail with reference to the drawings. The dimensions, materials, shapes, relative arrangements, and the like of the constituent components described for the embodiments are, however, mere examples, and should not be construed as limiting the scope of the present invention.

The embodiments of the present invention are described below with reference to FIGS. 1 through 27.

Embodiment 1

An embodiment of the present invention is described below with reference to FIGS. 1 through 10.

A camera module of the present embodiment is described as a camera module having an autofocus function and an image stabilizer function. The configuration of the present embodiment may, however, apply to a camera module having only an autofocus function but not an image stabilizer function as described below for Embodiment 4.

(Configuration of Camera Module)

Figure 1:
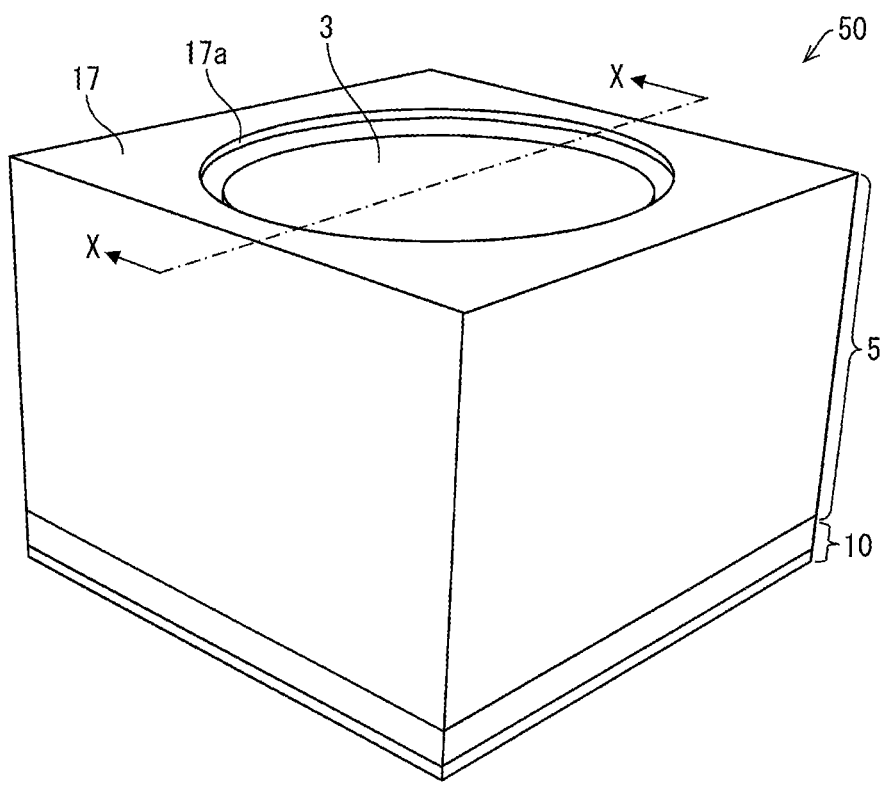
FIG. 1 is a perspective view of a camera module of Embodiment 1, the view illustrating an overall configuration of the camera module.
Figure 2:
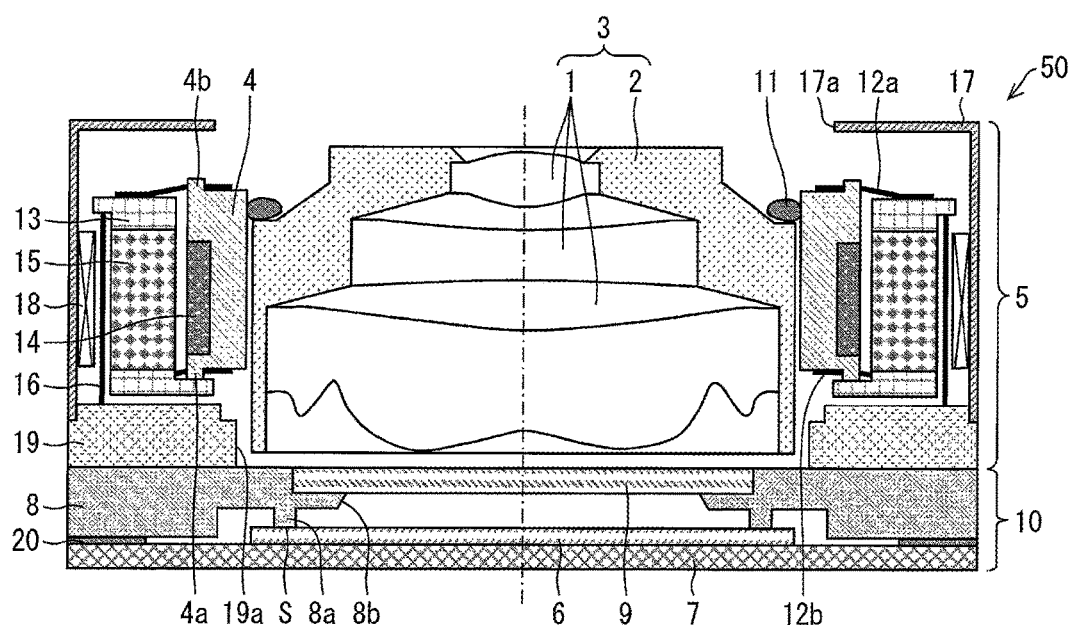
FIG. 2 is a central cross-sectional view of the camera module illustrated in FIG. 1, the view being taken along line X-X of FIG. 1.

First, with reference to FIGS. 1 and 2, the description below deals with a configuration of the camera module of the present embodiment as a camera module having an autofocus function and an image stabilizer function. FIG. 1 is a perspective view of the camera module of the present embodiment. FIG. 2 is a cross-sectional view of the camera module illustrated in FIG. 1, the view being taken along line X-X of FIG. 1.

The camera module 50 of the present embodiment is a camera module that has an autofocus function and an image stabilizer function and that is included in an electronic device, for example, a camera-equipped mobile telephone. The camera module 50 is, as illustrated in FIG. 1, substantially in the shape of a rectangular parallelepiped.

As illustrated in FIG. 1, the camera module 50 includes (i) an image pickup section 10 having a rectangular shape and disposed at a lower portion, (ii) an optical section 3 contained in a module cover 17 that has a box shape and that is disposed above the image pickup section 10, and (iii) a lens driving device 5 configured to drive the optical section 3. The module cover 17 has an upper surface that has, at a central portion, an aperture section 17a formed to expose image pickup lenses described below of the optical section 3. The description below uses, for convenience, (i) the term "above" to refer to the side on which the optical section 3 is present and (ii) the term "below" to refer to the side on which the image pickup section 10 is present.

The optical section 3 of the camera module 50 includes, as illustrated in FIG. 2, (i) image pickup lenses 1 and (ii) a lens barrel 2 configured to contain the image pickup lenses 1. The optical section 3 is surrounded by the lens driving device 5, which is configured to drive the optical section 3. The lens driving device 5 includes a lens holder 4 configured to fix the lens barrel 2 of the optical section 3 with use of an adhesive 11 to hold the lens barrel 2 inside.

The image pickup section 10, which is disposed below the lens driving device 5, includes a substrate 7, an image pickup element 6, a sensor cover 8, and a glass substrate 9. The substrate 7, the image pickup element 6, the sensor cover 8, and the glass substrate 9 are stacked on top of one another along the optical axis of the image pickup lenses 1 in the above order toward the image pickup lenses 1. In other words, the substrate 7 underlies the image pickup element 6, which carries out photoelectric conversion of light having passed through the optical section 3, and the image pickup element 6 is covered by the sensor cover 8 and the glass substrate 9.

The lens driving device 5 is configured such that the lens holder 4, to which the optical section 3 is fixed with use of the adhesive 11, is supported by two upper and lower AF (autofocus) springs 12a and 12b movably along the optical axis with respect to an intermediate support 13.

The lens holder 4 has an outer periphery portion to which an AF coil 14 is fixed. The intermediate support 13 is provided with an AF driving permanent magnet and an image stabilizer permanent magnet both fixed to the intermediate support 13. The present embodiment includes a single permanent magnet 15 fixed to the intermediate support 13 which permanent magnet 15 doubles as the above two kinds of permanent magnets.

The lens holder 4 has a protrusion 4a at a lower portion and a protrusion 4b at an upper portion. The protrusion 4a abuts on the intermediate support 13 at a mechanical end on an infinite-distance side of the optical axis direction within a movable range (that is, at a reference position on the side of the image pickup element within a movable range). The protrusion 4b, in a case where the lens holder 4 is moved in the direction above in FIG. 2 with respect to the intermediate support 13, comes into contact with the module cover 17 at a movable range limit position for the lens holder 4. The intermediate support 13 is supported by four suspension wires 16 (two of which are illustrated in FIG. 2) with respect to a fixing section (described later) movably in a biaxial direction perpendicular to the optical axis direction. This configuration allows the image pickup lenses 1, the lens barrel 2, the lens holder 4, the AF springs 12a and 12b, the intermediate support 13, the AF coil 14, and the permanent magnet 15 to be driven integrally in the direction perpendicular to the optical axis.

The present embodiment is configured such that in order to limit the movable range of the lens holder 4, the lens holder 4 has (i) a protrusion 4a on its infinite-distance side as a movable range limiting section and (ii) a protrusion 4b on its macro side as a movable range limiting section. The present embodiment is, however, not limited to such a configuration, and may alternatively be configured such that instead of the lens holder 4 having protrusions, the AF springs 12a and 12b abut on the module cover 17 or the intermediate support 13 as a movable range limiting section. In this case, the AF springs 12a and 12b double as a support section configured to support the intermediate support 13 and a movable range limiting section for the lens holder 4.

The fixing section includes, for example, the module cover 17, an optical image stabilizer (OIS) coil 18, and a base 19. Inside the base 19, part of the lens barrel 2 is in an opening 19a of the base 19 in a state where the optical section 3 is integrated with the fixing section. A camera module is typically configured as such because it is difficult to have a sufficiently large flange focal length (that is, the distance between the lower end surface of the lens barrel 2 and the image pickup element 6) for the image pickup lenses 1.

The lens barrel 2 and that surface of the base 19 which is inside the opening 19a need to be separated from each other by a gap set to have an appropriate value. This is for the following reason: In a case where a drop impact or the like has displaced the lens holder 4 in the lateral direction (that is, the direction perpendicular to the optical axis), that lateral displacement of the lens holder 4 may force the lens barrel 2 and the base 19 to collide with each other and to receive a large impact force, which may in turn break the lens barrel 2 or disengage and drop the image pickup lenses 1 inside the lens barrel 2. In view of that, the present embodiment is configured such that the gap between the lens barrel 2 and that surface of the base 19 which is on the side of the opening 19a is so set that even a maximum lateral displacement of the lens holder 4 will not cause the lens barrel 2 to abut directly on the base 19.

The image pickup section 10 is configured as follows: The sensor cover 8, on which the lens driving device 5 is mounted, (i) has a projection 8a at a lower portion which projection 8a has a reference surface S at a far end and (ii) abuts on the image pickup element 6 at the reference surface S. The sensor cover 8 is placed on the image pickup element 6 and the substrate 7 in such a manner as to cover the image pickup element 6 entirely. The sensor cover 8 has an opening 8b on the side of the image pickup lenses 1. The opening 8b is closed by the glass substrate 9, which has an infrared radiation cutting function.

The image pickup element 6 is mounted on the substrate 7. The substrate 7 and the sensor cover 8 may become separated from each other by a gap depending on the tolerance. The substrate 7 and the sensor cover 8 are, however, fixed to each other with use of an adhesive 20, with which the gap is filled.

The present embodiment is configured such that neither the lens barrel 2 nor the lens holder 4 has a screw, and is instead configured as described below such that in a state where the lens holder 4 is at an intermediate position, that is, the lens holder 4 is away from the movable range limit position on the infinite-distance side and that on the macro side, (i) the optical section 3 is positioned with use of a jig while the optical section 3 is being slid on the lens holder 4, and (ii) the optical section 3 is fixed to the lens holder 4 with use of the adhesive 11 at a position at which the optical section 3 has been positioned as in (i) above. The camera module 50, in which the optical section 3 and the lens holder 4 are fixed as above, is configured such that as illustrated in FIG. 2, in a state where the lens holder 4 is at the mechanical end on the infinite-distance side, the lens barrel 2 is at a predetermined position.

The present embodiment is configured such that the lens barrel 2 and the sensor cover 8 are separated from each other by a gap of approximately 10 µm. A later description will deal with how to produce a camera module 50 in such a manner that the lens barrel 2 and the sensor cover 8 do not abut on each other as above.

(AF Function and Image Stabilizer Function of Camera Module)

In a case where the optical section 3 of the camera module 50 configured as above of the present embodiment is moved back and forth along the optical axis for a focusing operation, a current is flown through the AF coil 14 of the lens driving device 5 in accordance with a driving instruction from a control section of, for example, a mobile telephone or digital camera that includes the camera module 50 of the present embodiment. The current flown through the AF coil 14 acts on a magnetic field generated by the permanent magnet 15. This produces thrust that moves the AF coil 14 along the optical axis, which in turn moves the optical section 3 back and forth along the optical axis via the AF springs 12a and 12b and the lens holder 4. This configuration allows for autofocus (AF) control of the optical section 3. The lens holder 4, the AF springs 12a and 12b, the AF coil 14, and the permanent magnet 15 thus function as an autofocus section of the present invention.

In a case where the optical section 3 of the camera module 50 of the present embodiment is integrally driven with use of an OIS (optical image stabilizer) function in the direction perpendicular to the optical axis direction, a current is flown through the OIS coil 18 of the lens driving device 5 in accordance with a driving instruction from a control section of, for example, a mobile telephone or digital camera that includes the camera module 50. The current flown through the OIS coil 18 acts on a magnetic field generated by the permanent magnet 15. This produces thrust that moves the permanent magnet 15 in the direction perpendicular to the optical axis direction, which in turn moves the optical section 3 back and forth in the direction perpendicular to the optical axis direction via the lens holder 4, the AF springs 12a and 12b, the intermediate support 13, and the suspension wire 16. This configuration allows for image stabilizer control of the optical section 3. The lens holder 4, the AF springs 12a and 12b, the intermediate support 13, the permanent magnet 15, the suspension wire 16, and the OIS coil 18 thus function as an image stabilizer section of the present invention.

(Position of Attachment of Optical Section to Lens Holder)

The description below deals with the position of attachment of the optical section 3, which includes the image pickup lenses 1 and the lens barrel 2, to the lens holder 4 of the lens driving device 5.

For the position of the attachment of the image pickup lenses 1 of the optical section 3 to the lens holder 4, the image pickup lenses 1 and the image pickup element 6 are desirably separated from each other by a distance so set that the camera module 50 focuses on an object at the mechanical end on the infinite-distance side.

However, there are, for example, a tolerance in the position of attachment of the image pickup lenses 1 to the lens barrel 2 and a tolerance in the thickness of the sensor cover 8. This inevitably causes variations among different members. Thus, in a case where the members are positioned without a focus adjustment with the lens barrel 2 abutting on another member, there remains an error. This makes it necessary to find a focusing position within the stroke range for the lens driving device 5 even with such a remaining error. This in turn makes it necessary to attach the image pickup lenses 1 to the lens holder 4 at such a position that the image pickup lenses 1 are slightly shifted to the side of the image pickup element 6 from the designed center value of the focusing position. The amount of such a shift is called over-infinity. In a case where the over-infinity is set at a large value, the stroke of the lens driving device 5 is large accordingly. The over-infinity thus needs to have a minimally required value.

In view of the sum of the various tolerances above, the amount of over-infinity being approximately 25 µm is adequate. This value is influenced by the component production tolerance, the assembly tolerance, and like. The amount of over-infinity is thus desirably set at a minimum value suitable for the actual situation. The camera module 50 of the present embodiment is structured such that (i) the reference surface S, located at a lower portion of the sensor cover 8, is pushed against the image pickup element 6 directly, (ii) a sensor cover 8 is used that has an increased thickness accuracy, and (iii) the lens barrel 2 is positioned highly accurately with respect to the upper surface of the sensor cover 8 (in other words, with respect to the lower surface of the lens driving device 5; The reference surface at a lower portion of the lens driving device 5 is mounted on the upper surface of the sensor cover 8). This structure uniquely allows for a small over-infinity amount of approximately 25 µm.

The camera module 50 illustrated in FIG. 2 is configured such that (i) the lens barrel 2 is attached at such a position as to be shifted by 25 µm to the side of the image pickup element 6 from a focusing position for an object at the infinite distance and that (ii) in such a state, the sensor cover 8 and the lens barrel 2 are separated from each other by a gap (approximately 10 µm).

As illustrated in FIG. 2, the lens barrel 2 is, after being positioned with respect to the lens holder 4, fixed with use of the adhesive 11. The present embodiment is configured such that in order for the adhesive 11 to be prevented from entering an area that does not require the adhesive 11, the adhesive 11 is applied to a position on the lens holder 4 which position is lower than the lens holder upper end surface of the lens holder 4, which lens holder upper end surface is opposite to the lens holder lower end surface of the lens holder 4, the lens holder lower end surface being on the side of the sensor cover 8. The lens holder upper end surface may be lifted to the top surface side, that is, to the side of the module cover 17. The lens barrel 2 may have a hole at the adhesive applying position.

(Method for Producing Camera Module)

The description below deals with a method for producing a camera module 50 of the present embodiment.

Positioning the lens barrel 2 for its height without a height adjustment for the initial position requires the lens barrel 2 to be positioned while the lens barrel 2 abuts on a member. The camera module 50 of the present embodiment is produced by a method that allows the lens barrel 2 to be initially positioned with high accuracy without the lens barrel 2 abutting on a member such as the sensor cover 8.

With reference to FIGS. 3 through 9, the description below deals with a method for producing a camera module 50 which method allows the lens barrel 2 to be initially positioned with high accuracy for fixation without not only using a screw for a focus adjustment for the initial position but also carrying out a height adjustment itself. FIGS. 3 through 9 are each a diagram illustrating an individual step for producing a camera module 50.

Figure 3:
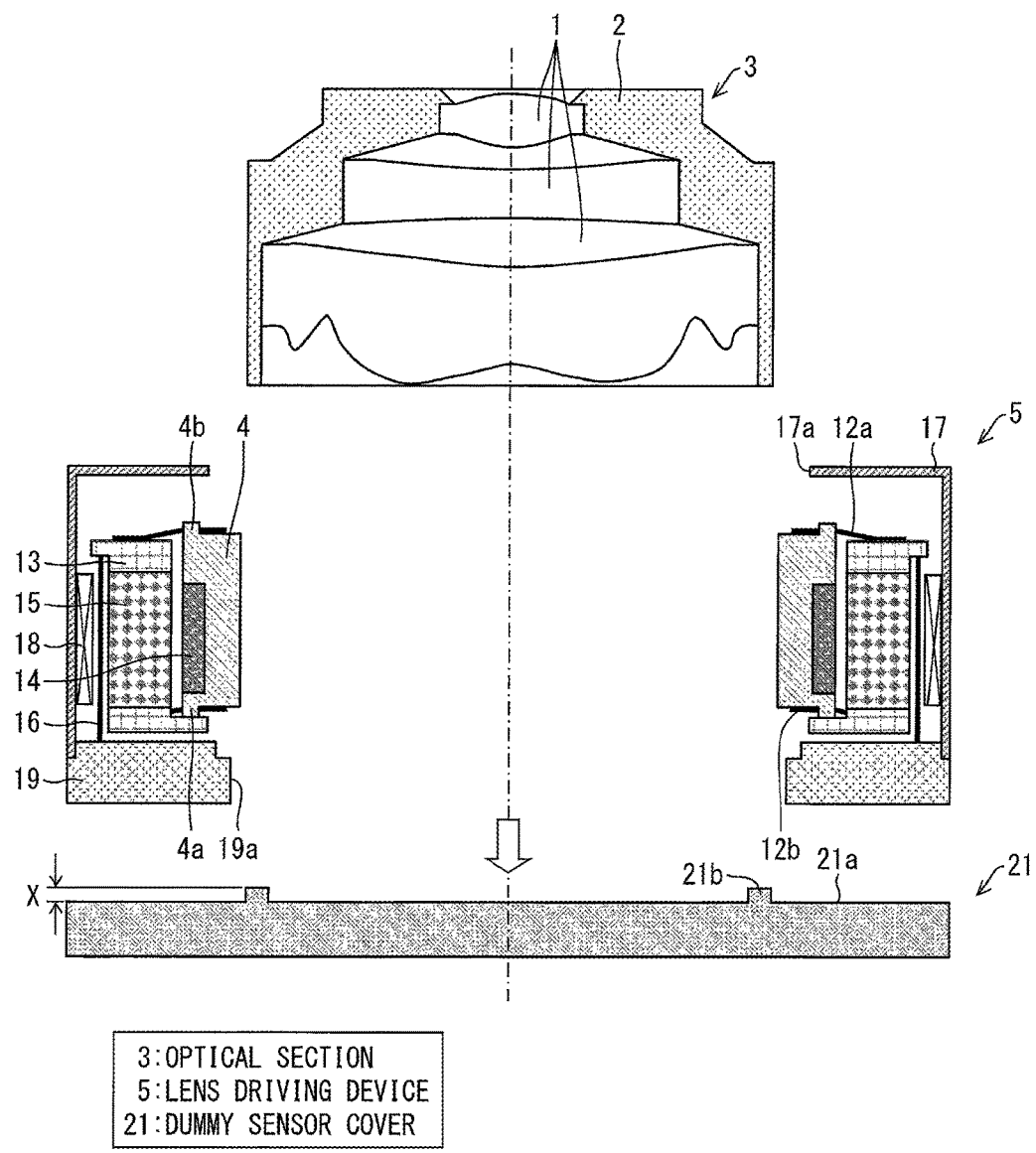
FIG. 3 is a cross-sectional view illustrating a step during a process of producing the camera module of Embodiment 1 which step is a step of preparing a dummy sensor cover as a jig.

With reference to FIG. 3, the description below first deals with a step of (i) preparing an optical section 3, a lens driving device 5, and a dummy sensor cover 21 and (ii) mounting the lens driving device 5 onto the dummy sensor cover 21.

Specifically, as illustrated in FIG. 3, the method for producing a camera module 50 of the present embodiment includes preparing a dummy sensor cover 21 as a jig for the production process. The dummy sensor cover 21 has (i) a flat surface 21a on which the lens driving device 5 is mounted and (ii) an extrusion section 21b extruding from the flat surface 21a. There is a height difference X between the extrusion section 21b and the flat surface 21a, which difference X may simply be set as a gap that prevents the dummy sensor cover 21 from coming into contact with the sensor cover 8, the glass substrate 9, or the like in a case where the lens barrel 2 has been displaced in the direction perpendicular to the optical axis. Typically, a difference X of approximately 5 µm to 10 µm or more can function as a gap. The designed value may be 5 µm or 10 µm. It is desirable to prepare a dummy sensor cover 21 having a difference X as close as possible to the designed value. The present embodiment has a difference X of approximately 10 µm.

Figure 4:
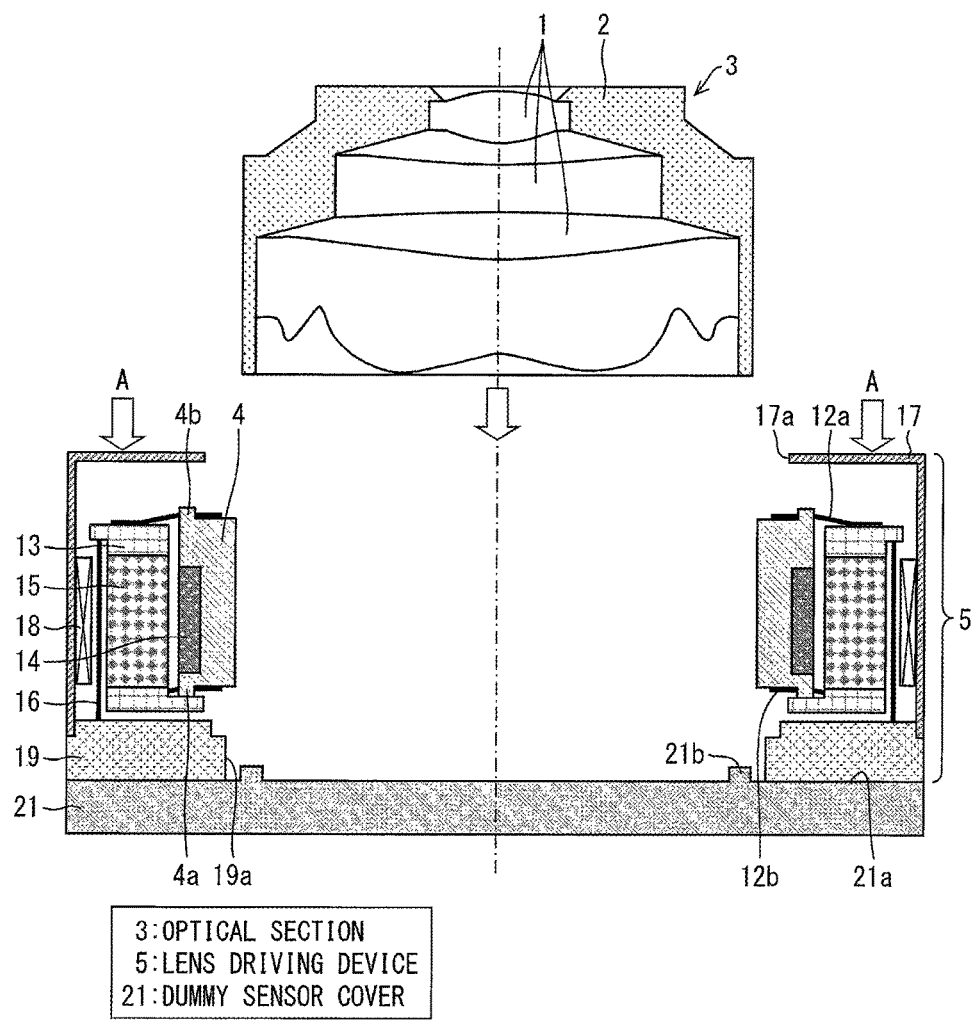
FIG. 4 is a cross-sectional view illustrating a step during a process of producing the camera module of Embodiment 1 and a state where a lens driving device is mounted on a dummy sensor cover.

With reference to FIG. 4, the description below deals with a state where the lens driving device 5 is mounted on the dummy sensor cover 21.

The lens driving device 5 is, as described above, mounted on the flat surface 21a of the dummy sensor cover 21. The extrusion section 21b is, as a result, in the opening 19a of the base 19 of the lens driving device 5.

While the lens driving device 5 is mounted on the flat surface 21a of the dummy sensor cover 21, a pressing pressure is desirably applied in the direction indicated by the arrows A in FIG. 4. A pressing pressure is preferably applied as such for the following reason: As described above, the lens barrel 2 needs to be positioned highly accurately with respect to the lower surface of the lens driving device 5. If the lens driving device 5 is lifted off from the dummy sensor cover 21, the accuracy will decrease.

Figure 5:
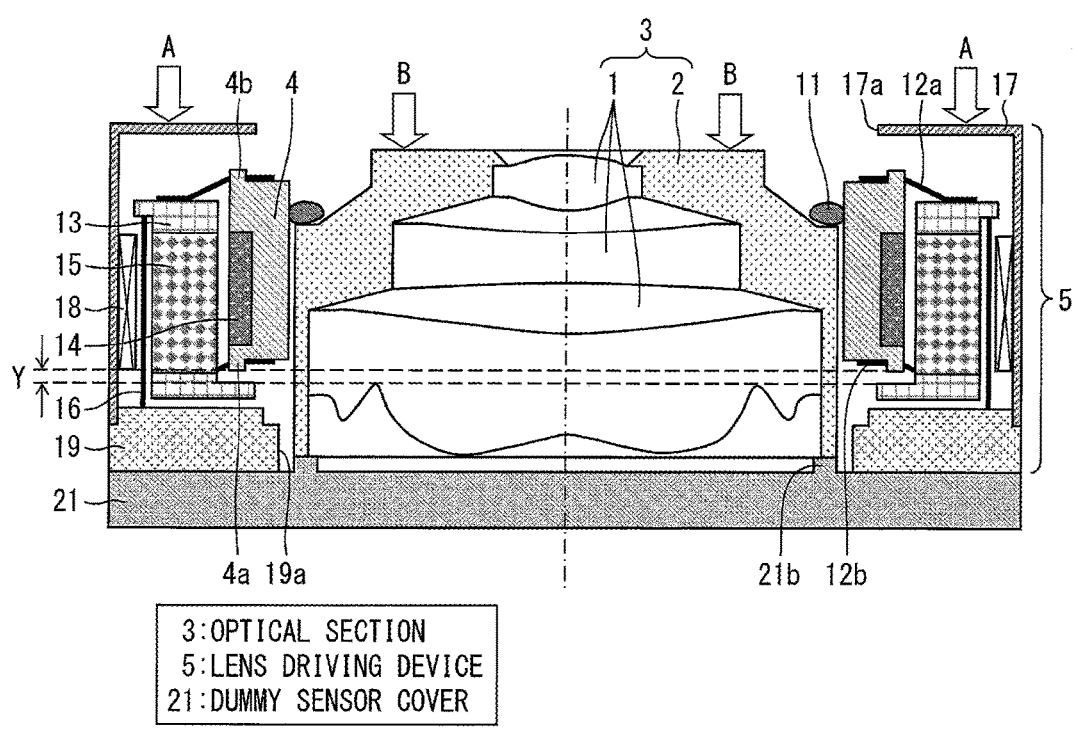
FIG. 5 is a cross-sectional view illustrating a step during a process of producing the camera module of Embodiment 1 and a state where a lens barrel is mounted on a lens driving device in such a manner as to abut on an extrusion section of a dummy sensor cover with a lens holder lifted with use of a current.

With reference to FIG. 5, the description below deals with a state where the lens barrel 2 is mounted in the lens driving device 5 in such a manner as to abut on the extrusion section 21b of the dummy sensor cover 21.

FIG. 5 illustrates a configuration greatly distinct from conventional configurations (Patent Literature 2). FIG. 5 illustrates a configuration in which a current is flown through the AF coil 14 of the lens driving device 5 so that the lens holder 4 is lifted by a predetermined amount Y from the intermediate support 13. The predetermined amount Y, by which the lens holder 4 is lifted off from the intermediate support 13, desirably has a value that is not smaller than the assumed amount of two-stage activation. In other words, the predetermined amount Y, by which the lens holder 4 is lifted off from the intermediate support 13, desirably has a value that allows the lens holder 4 to be higher than the position at which the lens holder 4 lies when two-stage activation ends. Removing the current causes the lens barrel 2 to become close to the image pickup element 6 by the predetermined amount Y. Thus, in order for the amount of over-infinity to be 25 μm with the current removed, the lens barrel 2 has a shape so designed that in the state illustrated in FIG. 5, the image pickup lenses 1 are shifted to the side of the image pickup element 6 by 25 μm—Y from the infinite-distance-side focusing position in a state where the lower end surface of the lens barrel 2 abuts on the extrusion section 21b of the dummy sensor cover 21. Of course, the actual camera module 50 has a tolerance with respect to the designed value. While the lower end surface of the lens barrel 2 abuts on the extrusion section 21b of the dummy sensor cover 21, a pressing pressure is desirably applied in the direction indicated by the arrows B in FIG. 5. The pressing pressure applied to the lens driving device 5 as indicated by the arrows A in FIG. 4 desirably continues to be applied as well. This is for the following reason: Since both the lens barrel 2 and the lens driving device 5 each have a reference position set with each of the lens barrel 2 and the lens driving device 5 abutting on another member, an error occurs if either the lens barrel 2 or the lens driving device 5 is lifted off from the dummy sensor cover 21. The lens barrel 2 is fixed to the lens holder 4 with use of the adhesive 11 in the state where the pressing pressures are applied as above (that is, the lens barrel 2 and the lens driving device 5 are prevented from becoming lifted off from the dummy sensor cover 21).

FIG. 5 illustrates the lens holder 4 as being lifted off from the intermediate support 13 by the predetermined amount Y at both of the left and right sides of FIG. 5. The predetermined amount Y may differ between the left and right sides by approximately several micrometers.

Specifically, in the state illustrated in FIG. 5, the lens barrel 2 is inserted in the lens holder 4 with the lens holder 4 lifted off from the intermediate support 13. With a slight gap between the lens barrel 2 and the lens holder 4, the lens barrel 2 is attached with the accuracy of not the hole of the lens holder 4 but the extrusion section 21b of the dummy sensor cover 21 as a jig.

Thus, even in a case where the lens holder 4 (which is lifted off from the intermediate support 13) has a tilt, such a tilt does not influence the attachment of the lens barrel 2 because the lens barrel 2 is not attached with the accuracy of the hole of the lens holder 4. The above configuration thus allows the lens barrel to be attached with high accuracy.

In order to minimize the tilt within the practicable range, the amount of over-infinity should be larger than the amount of two-stage activation (that is, the amount of one-side suspension). The description above mentions the amount of over-infinity as being 25 μm. However, if different variations may eliminate over-infinity, the amount of over-infinity may alternatively have the sum of 25 μm and the amount of two-stage activation. It is further desirable to reduce variations so that the amount of over-infinity does not exceed 25 μm even with the amount of two-stage activation added.

Figure 6:
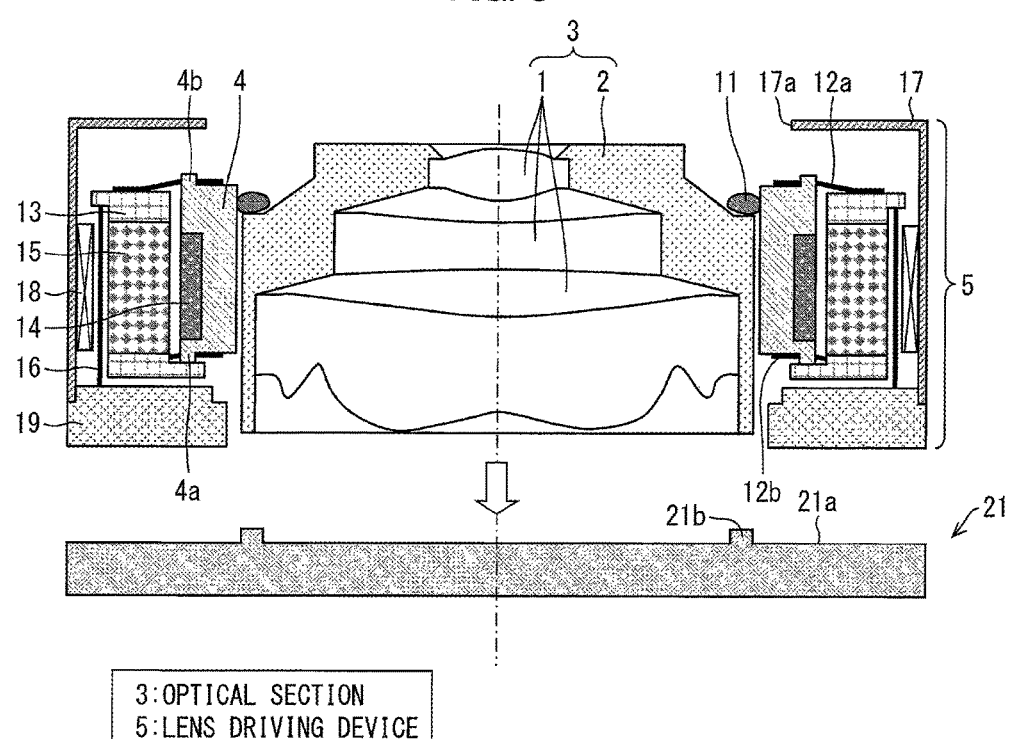
FIG. 6 is a cross-sectional view illustrating a step during a process of producing the camera module of Embodiment 1 and a state where a dummy sensor cover has been detached from a lens driving device.

With reference to FIG. 6, the description below deals with a state where the dummy sensor cover 21 has been detached from the lens driving device 5.

As illustrated in FIG. 6, the dummy sensor cover 21 serves only as a jig for positioning the lens barrel 2, and is unnecessary after the lens barrel 2 is fixed to the lens holder 4 with use of the adhesive 11. Further, the current flown to lift the lens holder 4 is unnecessary as well after the fixation. Mathematically, in the state illustrated in FIG. 6, the lens barrel 2 is attached at the position of the over-infinity of 25 μm. If two-stage activation is assumed to be 10 μm, the infinite-distance-side focusing position corresponds to a position that lies 15 μm beyond the position at which the two-stage activation ends. The lens barrel 2 is so fixed to the lens holder 4 that the lens holder 4 has a minimum tilt at the above stroke position. The above configuration can thus minimize the tilt that falls within the working range necessary for a camera module.

Figure 7:
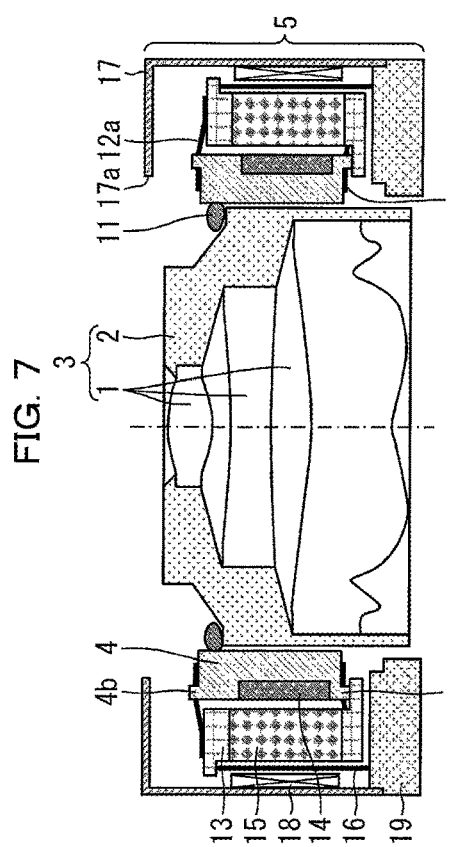
FIG. 7 is a cross-sectional view illustrating a step during a process of producing the camera module of Embodiment 1 which step is a step of preparing an image pickup section and replacing a dummy sensor cover with the image pickup section.
Figure 7:
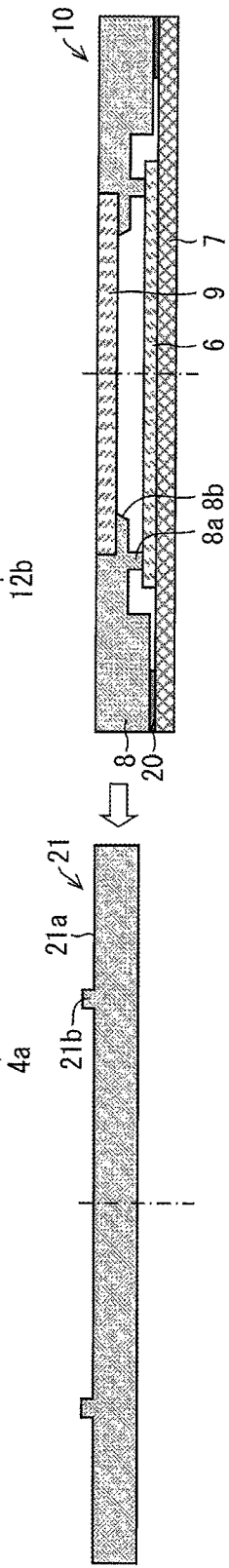

With reference to FIG. 7, the description below deals with a step of preparing an image pickup section 10 and replacing the dummy sensor cover 21 with the image pickup section 10.

As illustrated in FIG. 7, the dummy sensor cover 21 needs to be replaced by the image pickup section 10 (which includes the image pickup element 6) so that the image pickup section 10 is joined to the lens driving device 5 (in which the optical section 3 has already been fixed).

Figure 8:
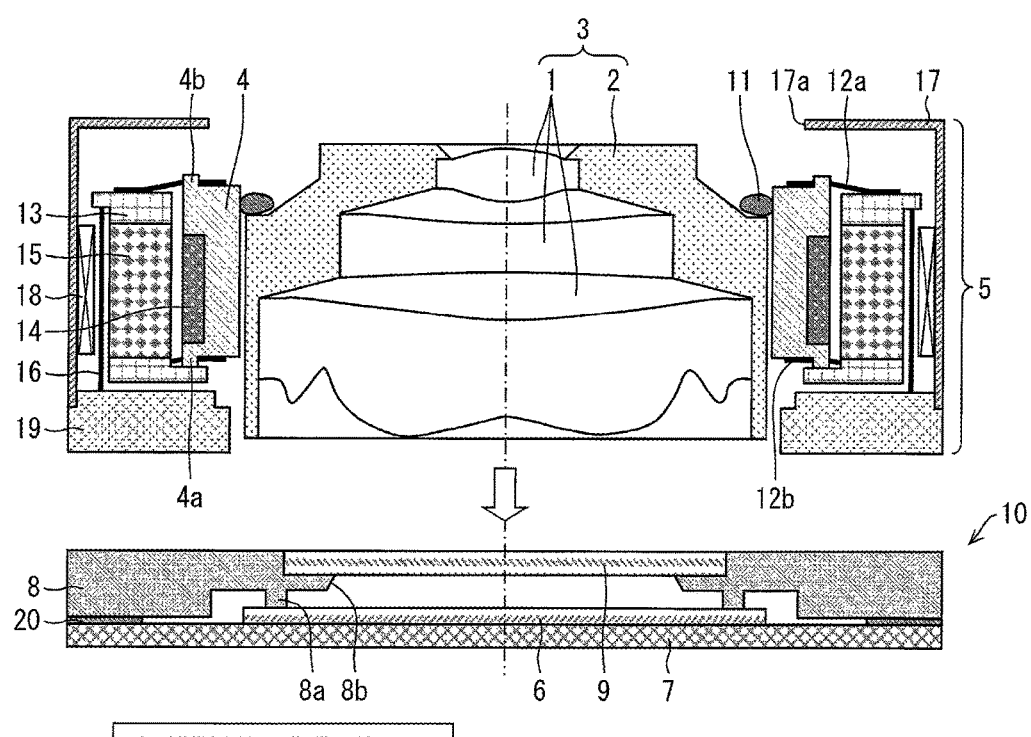
FIG. 8 is a cross-sectional view illustrating a step during a process of producing the camera module of Embodiment 1 which step is a step of mounting, onto an image pickup section, a lens driving device including an optical section built therein.

With reference to FIG. 8, the description below deals with a step of mounting the lens driving device 5 (which includes the optical section 3 built therein) onto the image pickup section 10.

As illustrated in FIG. 8, the lens driving device 5 (which includes the optical section 3 built therein) is mounted onto the upper surface of the sensor cover 8 of the image pickup section 10 and fixed to the upper surface with use of an adhesive (not shown in FIG. 8).

Figure 9:
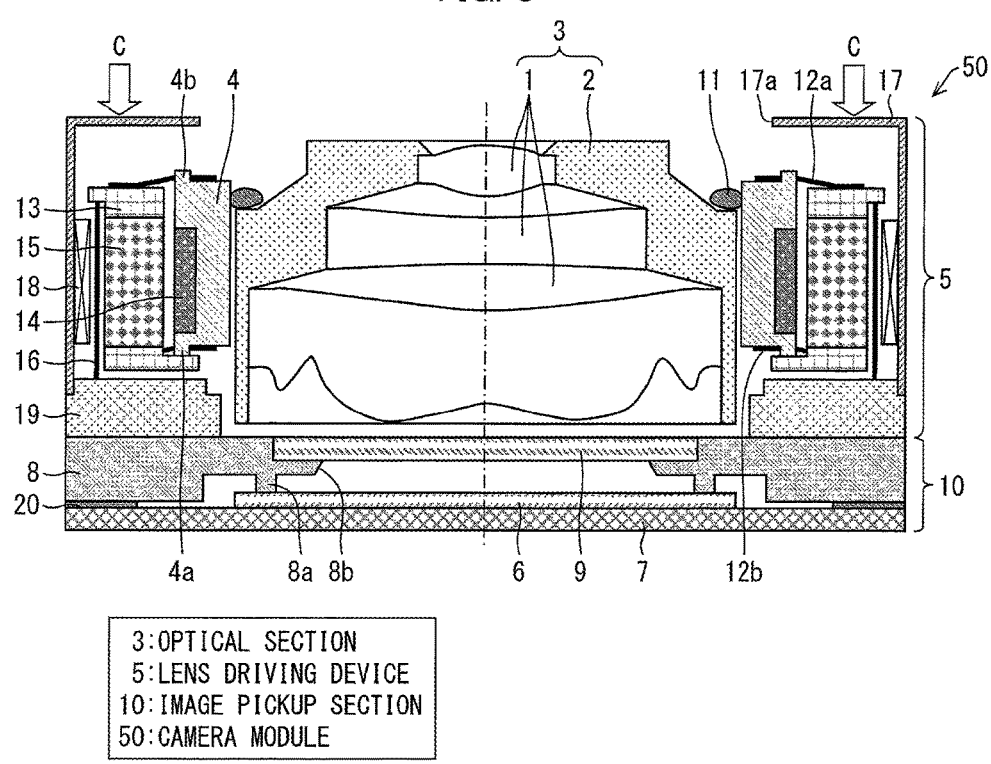
FIG. 9 is a cross-sectional view illustrating a step during a process of producing the camera module of Embodiment 1 and a state where a lens driving device including an optical section built therein is mounted on an image pickup section.

With reference to FIG. 9, the description below deals with a state where the lens driving device 5 (which includes the optical section 3 built therein) is mounted on the image pickup section 10.

As illustrated in FIG. 9, until the adhesive that bonds the lens driving device 5 and the sensor cover 8 to each other becomes hardened to a necessary strength, a pressing pressure is desirably applied in the direction indicated by the arrows C in FIG. 9. This is for a reason similar to the above: so that the lens driving device 5 will not become lifted off from the upper surface of the sensor cover 8.

The method described above allows for production of a camera module 50 in which (i) image pickup lenses 1 are positioned highly accurately and (ii) the tilt due to the influence of two-stage activation has been reduced.

The dummy sensor cover 21 described above is desirably a non-magnetic body. In a case where the dummy sensor cover is a magnetic body, the permanent magnet 15, mounted on an OIS movable section of the lens driving device 5, is attracted to the dummy sensor cover. This may cause the lens barrel 2 to be fixed in a state where the lens holder 4 is changed in position or tilted. In this case, detaching the dummy sensor cover and letting the lens holder 4 return to its original position will cause the lens barrel 2 to be attached at a decentered position or tilted, possibly with the undesirable result of the lens barrel 2 being tilted. In view of this, at least the dummy sensor cover 21 is desirably a non-magnetic body, and any other jig or tool disposed near the dummy sensor cover 21 is further desirably non-magnetic.

(Discussion about Inclination of Lens Holder)

The camera module 50 of the present embodiment is configured such that the lens barrel 2 has an attachment height and lean that are regulated with use of the dummy sensor cover 21 as a reference. Stated conversely, even in a case where the lens holder 4 has a leaned cylindrical hole for the attachment of the lens barrel 2, the lens barrel 2 is not subject to the lean as long as the lean is within a permissible range. This allows for production of a camera module 50 having a small initial inclination, that is, a small static tilt. The description below deals with a permissible limit on such a tilt of the lens holder 4 with reference to FIG. 10.

Figure 10:
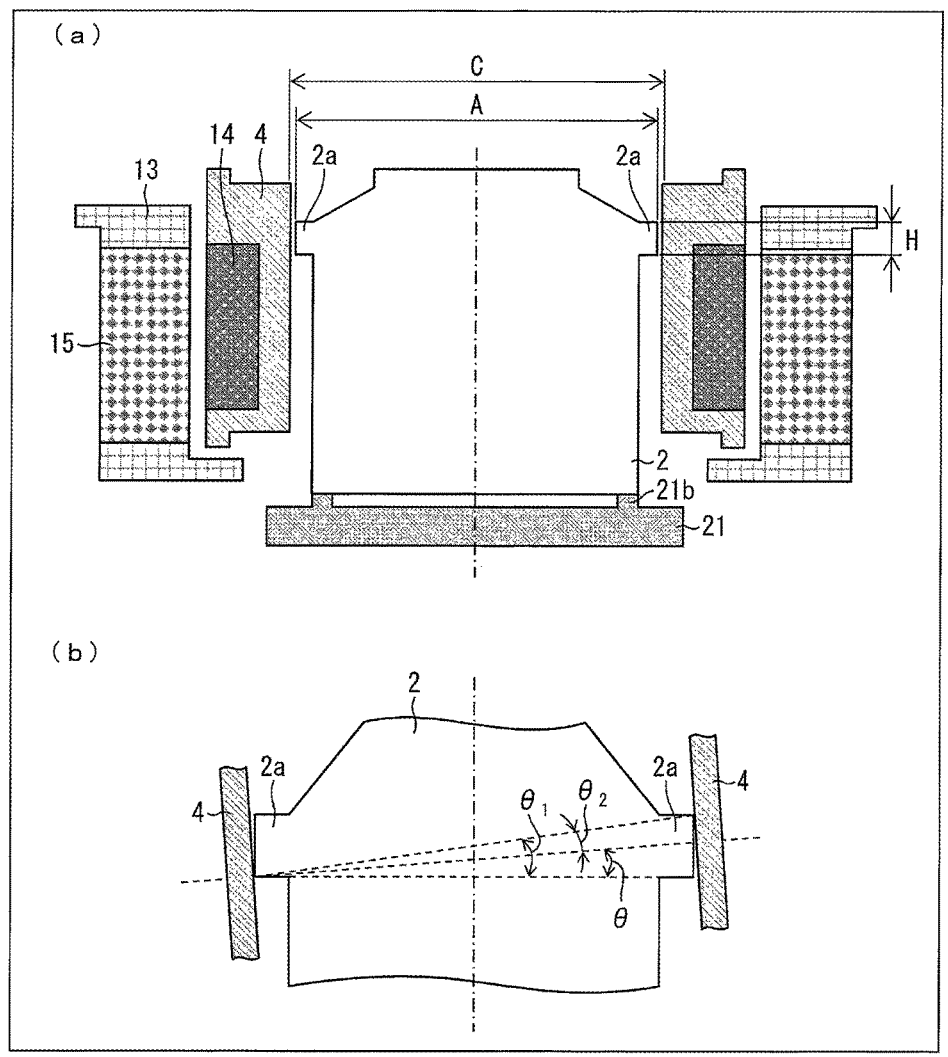
FIG. 10 provides cross-sectional views of a main part, the views each illustrating the influence of an inclination of a lens holder in the camera module of Embodiment 1.

(a) of FIG. 10 is a cross-sectional view of a main part, the view illustrating the influence of an inclination of the lens holder 4. (b) of FIG. 10 is a diagram illustrating a state where the lens holder 4 is inclined.

The cross-sectional view of the camera module 50 in FIG. 2 does not illustrate the outer shape of the lens barrel 2 in detail. However, the actual lens barrel 2 does not have a maximum outer diameter portion 2a over the entire range in the height direction: The maximum outer diameter portion 2a is limited to only a portion of the range, and the diameter is slightly smaller over the other portion of the range as illustrated in (a) of FIG. 10. The description uses (i) the symbol "A" to indicate the outer diameter of the maximum outer diameter portion 2a of the lens barrel 2, (ii) the symbol "H" to indicate the thickness of the maximum outer diameter portion 2a of the lens barrel 2, and (iii) the symbol "C" to indicate the cylinder inner diameter of the lens holder 4.

As illustrated in (b) of FIG. 10, the maximum outer diameter portion 2a of the lens barrel 2 comes into contact with the lens holder 4 at an inclination angle $\theta_1$, which is represented with use of the outer diameter A and the thickness H by Equation 1 below.

$$\theta_1 = \tan^{-1}(H/A) \quad \text{(Equation 1)}$$

In a case where, for example, the outer diameter A is 5 mm and the thickness H is 0.5 mm, the inclination angle $\theta_1$ is 5.71 degrees. The inclination angle $\theta$ of the lens holder 4 does not normally reach 5.71 degrees. The inclination angle $\theta$ of the lens holder 4 are compared with the inclination angle $\theta_1$ in terms of size as illustrated in (b) of FIG. 10. The difference $\theta_2$ therebetween is thus represented by Equation 2 below.

$$\theta_2 = \cos^{-1}(C/\sqrt{(A^2+H^2)}) \quad \text{(Equation 2)}$$

The lens holder 4 thus has a permissible inclination angle $\theta$ represented by Equation 3 below.

$$\theta \leq \theta_1 - \theta_2 = \tan^{-1}(H/A) - \cos^{-1}(C/\sqrt{(A^2+H^2)}) \quad \text{(Equation 3)}$$

In a case where the lens holder 4 has an inclination angle $\theta$ within the above range, an inclination of the lens holder 4 is not added to the inclination of the lens barrel 2, which allows the lens barrel 2 to be fixed with use of the dummy sensor cover 21 as a reference. This in turn allows for production of a camera module 50 having a low inclination angle.

In a case where, for example, the cylinder inner diameter C is 5.005 mm, the difference $\theta_2$ is $\theta_2 = 5.11$ degrees. This allows for a permissible value of $\theta = 0.6$ degree.

Embodiment 2

The description below deals with Embodiment 2 of the present invention with reference to FIG. 11. The present embodiment differs from Embodiment 1 above in that the present embodiment is configured to produce a camera module 50 with use of a height adjusting device 30 as a jig. Regarding the other aspects of the configuration, the present embodiment is as described about Embodiment 1. For convenience of description, any member of the present embodiment that is identical in function to a corresponding member illustrated in the drawings for Embodiment 1 above is assigned a common reference numeral, and is not described here.

(Another Method for Producing Camera Module)

Figure 11:
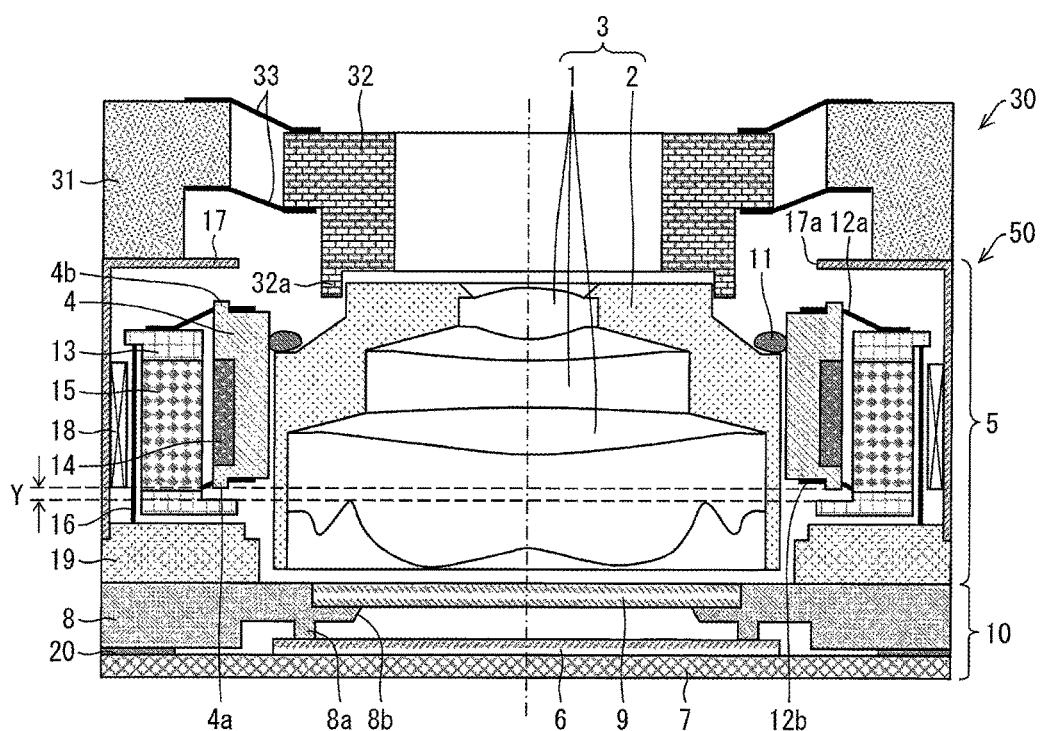
FIG. 11 is a cross-sectional view illustrating a process of producing a camera module of Embodiment 2.

FIG. 11 is a cross-sectional view illustrating a method for producing a camera module 50 with use of the height adjusting device 30.

The method of the present embodiment for producing a camera module 50 includes first placing the height adjusting device 30 on the upper surface of the lens driving device 5 as illustrated in FIG. 11.

As illustrated in FIG. 11, the height adjusting device 30 includes, for example, a mount 31 configured to be fixed to the lens driving device 5, an arm section 32 configured to grip the lens barrel 2, and a support spring 33 configured to support the arm section 32 in such a manner that the arm section 32 is movable along the optical axis with respect to the mount 31.

FIG. 11 does not particularly illustrate a driving section for the arm section 32. The arm section 32 may be driven by a voice coil motor or a driving section such as a piezoelectric element as with the lens driving device 5. Further, the arm section 32 is desirably configured such that (i) the arm section 32 has an openable and closable grip section 32a at a far end of a lower portion and that (ii) the grip section 32a grips the lens barrel 2 firmly with use of a pressurizing spring (not shown in FIG. 11). In a state where the grip section 32a grips the lens barrel 2 as such, the arm section 32 is raised and lowered with use of a driving section (not shown in FIG. 11). The lens barrel 2 and the lens holder 4 are fixed to each other with use of the adhesive 11 at a position at which focusing has been detected.

It is important for the lens barrel 2 and the sensor cover 8 to be separated from each other by a gap in a state where the lens barrel 2 and the lens holder 4 are fixed to each other with use of the adhesive 11 as above. The present embodiment adjusts the height of the lens barrel 2, and thus does not need an extra stroke as over-infinity. It is most desirable from the viewpoint of the stroke of the lens driving device 5 to position the lens barrel 2 and the lens holder 4 with over-infinity in an amount sufficient to cover an adjustment error that may possibly occur (approximately several micrometers). Further, the position of the lens barrel 2 is adjusted in a state where the lens holder 4 is lifted away from the intermediate support 13 by the predetermined amount Y as in FIG. 5. Adjusting the position of the lens barrel 2 in the state where the lens holder 4 is lifted as above can prevent the influence of a tilt due to two-stage activation as described above with reference to FIG. 5. After the lens barrel 2 is fixed with use of the adhesive 11, the arm section 32 is stopped from gripping the lens barrel 2 to release the lens barrel 2, and the height adjusting device 30 is detached from the lens driving device 5. The current is stopped from flowing to release the lens holder 4 from the lifted state.

The adjusting method described above eliminates the need to turn a screw for a focus adjustment for the initial position, and thus does not require application of strong force, so that only very small friction force caused by the lens barrel 2 being inserted into the lens holder 4 acts on the lens holder 4. Thus, even though there is merely an unstable balance between the force of the current and that of the springs, (i) almost no other spring deformation is caused by external force, (ii) the spring supporting the movable section has only a low risk of breakage, and (iii) it is possible to minimize the positional change of the lens barrel 2 which positional change is due to spring deformation. The adjusting method can therefore increase the accuracy of positioning the lens barrel 2.

FIG. 11 illustrates the lens holder 4 as being lifted off from the intermediate support 13 by the predetermined amount Y at both of the left and right sides of FIG. 11. The predetermined amount Y may differ between the left and right sides by approximately several micrometers.

Embodiment 3

The description below deals with Embodiment 3 of the present invention with reference to FIG. 12. A camera module 60 of the present embodiment differs from Embodiments 1 and 2 above in that the present embodiment includes AF springs 12c and 12d that allow the lens holder 4 to be lifted off from the intermediate support 13 in a state where a lens driving device 5a is not in operation, that is, no current is flown through the AF coil 14. Regarding the other aspects of the configuration, the present embodiment is as described about Embodiments 1 and 2. For convenience of description, any member of the present embodiment that is identical in function to a corresponding member illustrated in the drawings for Embodiments 1 and 2 above is assigned a common reference numeral, and is not described here.

Figure 12:
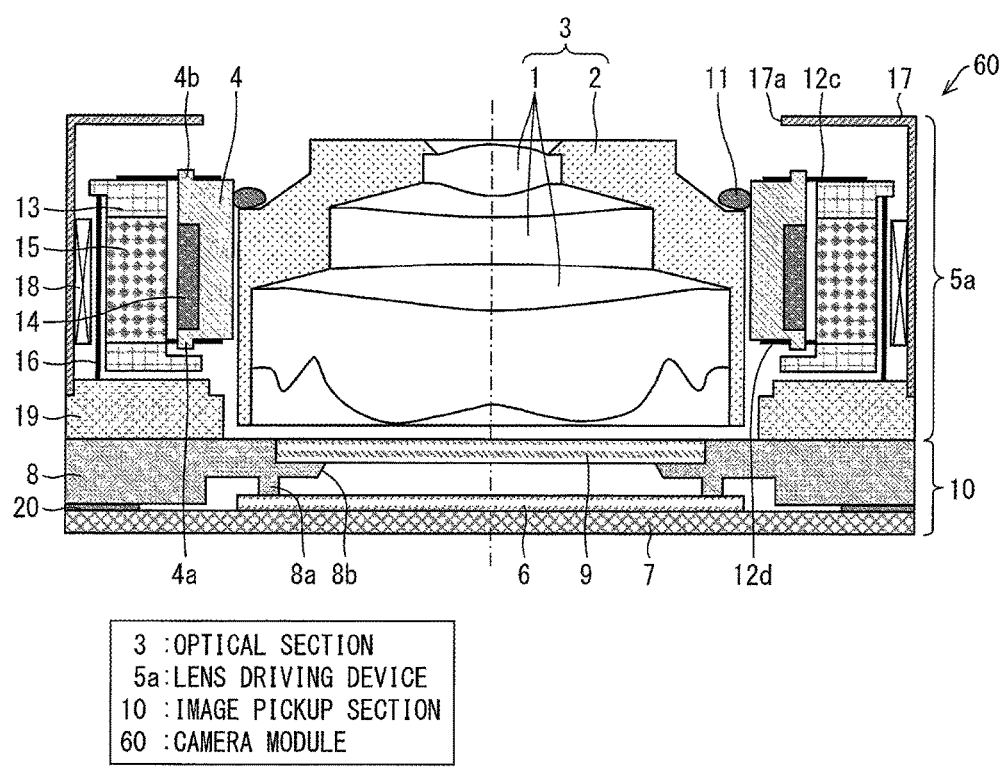
FIG. 12 is a cross-sectional view illustrating a configuration of a camera module including a lens driving device including an AF movable section neutrally held by springs.

FIG. 12 is a cross-sectional view of a camera module 60 including a lens driving device 5a including a lens holder 4 neutrally held by AF springs 12c and 12d, the view illustrating a configuration of the camera module 60.

Embodiments 1 and 2 are configured such that flowing a current generates force that causes the lens holder 4 to be lifted off from the intermediate support 13. The camera module 60 of the present embodiment is, in contrast, configured to include AF springs 12c and 12d attached to originally hold the lens holder 4 lifted off from the intermediate support 13.

The camera module 60 of the present embodiment is, as illustrated in FIG. 12, configured to include AF springs 12c and 12d attached to originally hold the lens holder 4 lifted off from the intermediate support 13. Even with gravity acting on an AF movable section such as the lens holder 4, the lens holder 4 is lifted off from the intermediate support 13.

The camera module 60 is configured such that in order to avoid the influence of a tilt due to two-stage activation, the lens holder 4 is lifted not by force of a current flown but by force of springs.

As described above, Patent Literature 1 discloses using spring force to make a lens holder neutral. Patent Literature 1 discloses a structure in which the lens holder is adjusted with use of a screw formed for each of the lens holder and the lens barrel. The method disclosed in Patent Literature 1 thus problematically fails to avoid the influence of a tilt of the lens holder or screw section. The method is further problematic in that force applied to screw the respective screws into the lens holder and the lens barrel undesirably causes the adjusted position to be shifted.

The present embodiment is, in contrast, configured to fix the lens barrel 2 to the lens holder 4 with use of the adhesive 11 and a jig used for Embodiment 1 or 2. Thus, the lens barrel 2 is attached with the accuracy of not the hole of the lens holder 4 but the extrusion section 21b of the dummy sensor cover 21 as a jig or the height adjusting device 30.

Therefore, a tilt does not influence the attachment of the lens barrel 2 because the lens barrel 2 is not attached with the accuracy of the hole of the lens holder 4. The above configuration thus allows the lens barrel to be attached with high accuracy.

The present embodiment is configured such that in order to limit the movable range of the lens holder 4, the lens holder 4 has (i) a protrusion 4a on its infinite-distance side as a movable range limiting section and (ii) a protrusion 4b on its macro side as a movable range limiting section. The present embodiment is, however, not limited to such a configuration, and may alternatively be configured such that instead of the lens holder 4 having protrusions, the AF springs 12c and 12d abut on the module cover 17 or the intermediate support 13 as a movable range limiting section. In this case, the AF springs 12c and 12d double as a support section configured to support the intermediate support 13 and a movable range limiting section for the lens holder 4.

Embodiment 4

The description below deals with Embodiment 4 of the present invention with reference to FIGS. 13 through 19. A camera module 70 of the present embodiment differs from Embodiment 1 above in that the camera module 70 does not have an OIS function and has only an autofocus function. Regarding the other aspects of the configuration, the present embodiment is as described about Embodiment 1. For convenience of description, any member of the present embodiment that is identical in function to a corresponding member illustrated in the drawings for Embodiment 1 above is assigned a common reference numeral, and is not described here.

(Configuration of Camera Module)

Figure 13:
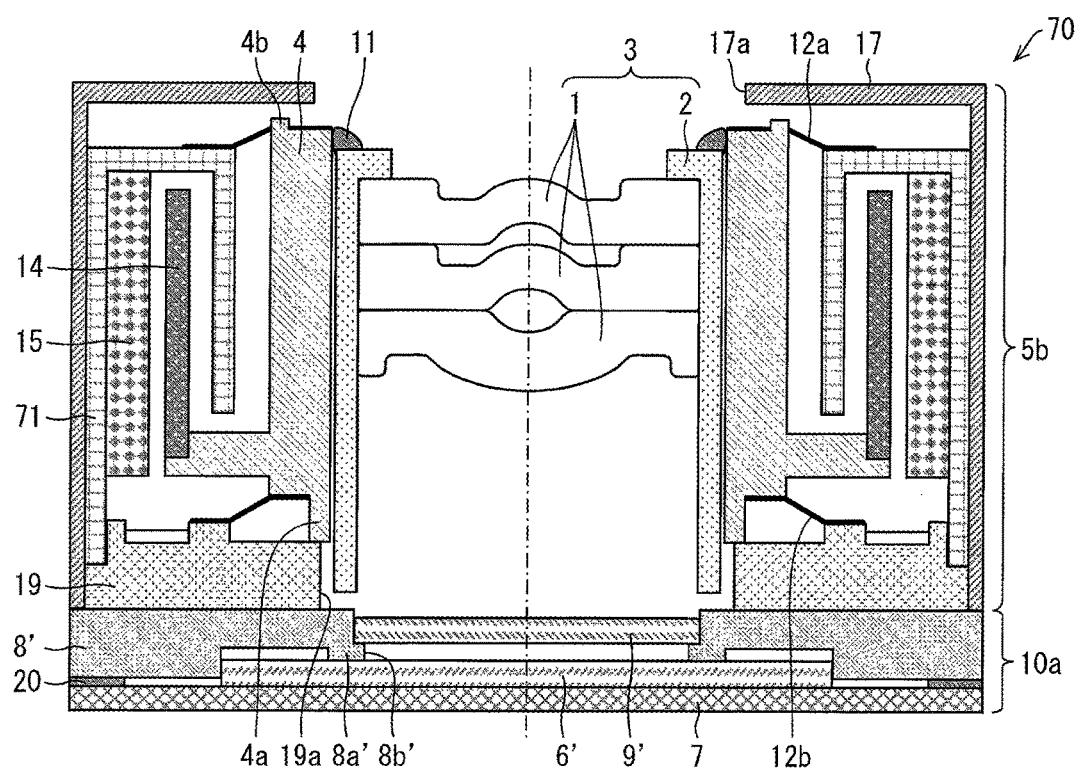
FIG. 13 is a cross-sectional view illustrating a configuration of a camera module not having an OIS function.

FIG. 13 is a central cross-sectional view of a camera module 70.

First, with reference to FIG. 13, the description below deals with a configuration of the camera module 70 of the present embodiment.

The camera module 70 includes (i) an image pickup section 10a, (ii) an optical section 3 contained in a module cover 17 that has a box shape and that is disposed above the image pickup section 10a, and (iii) a lens driving device 5b configured to drive the optical section 3.

The lens driving device 5b is configured such that the lens holder 4, to which the optical section 3 is fixed with use of an adhesive 11, is supported by two upper and lower AF (autofocus) springs 12a and 12b movably along the optical axis with respect to a fixing section. The lens holder 4 has an outer periphery portion to which an AF coil 14 is fixed. The fixing section includes, for example, (i) a yoke 71 configured to hold an AF driving permanent magnet 15, (ii) a base 19, and (iii) a module cover 17. The upper AF spring 12a has an end fixed to the yoke 71. The lower AF spring 12b has an end fixed to the base 19. The present embodiment differs from Embodiment 1 in that the present embodiment does not have an OIS function. The present embodiment thus does not need, for example, an intermediate support or a suspension wire.

The present embodiment may include the image pickup section 10 used for Embodiment 1 described above. However, for the purpose of describing the present embodiment as being capable of including any of various image pickup sections having different shapes, the present embodiment includes, as an example, an image pickup section 10a identical in function to the image pickup section 10 used for Embodiment 1 but different only in shape from the image pickup section 10.

(Method for Producing Camera Module)

With reference to FIGS. 14 through 19, the description below deals with a method for producing a camera module 70.

Figure 14:
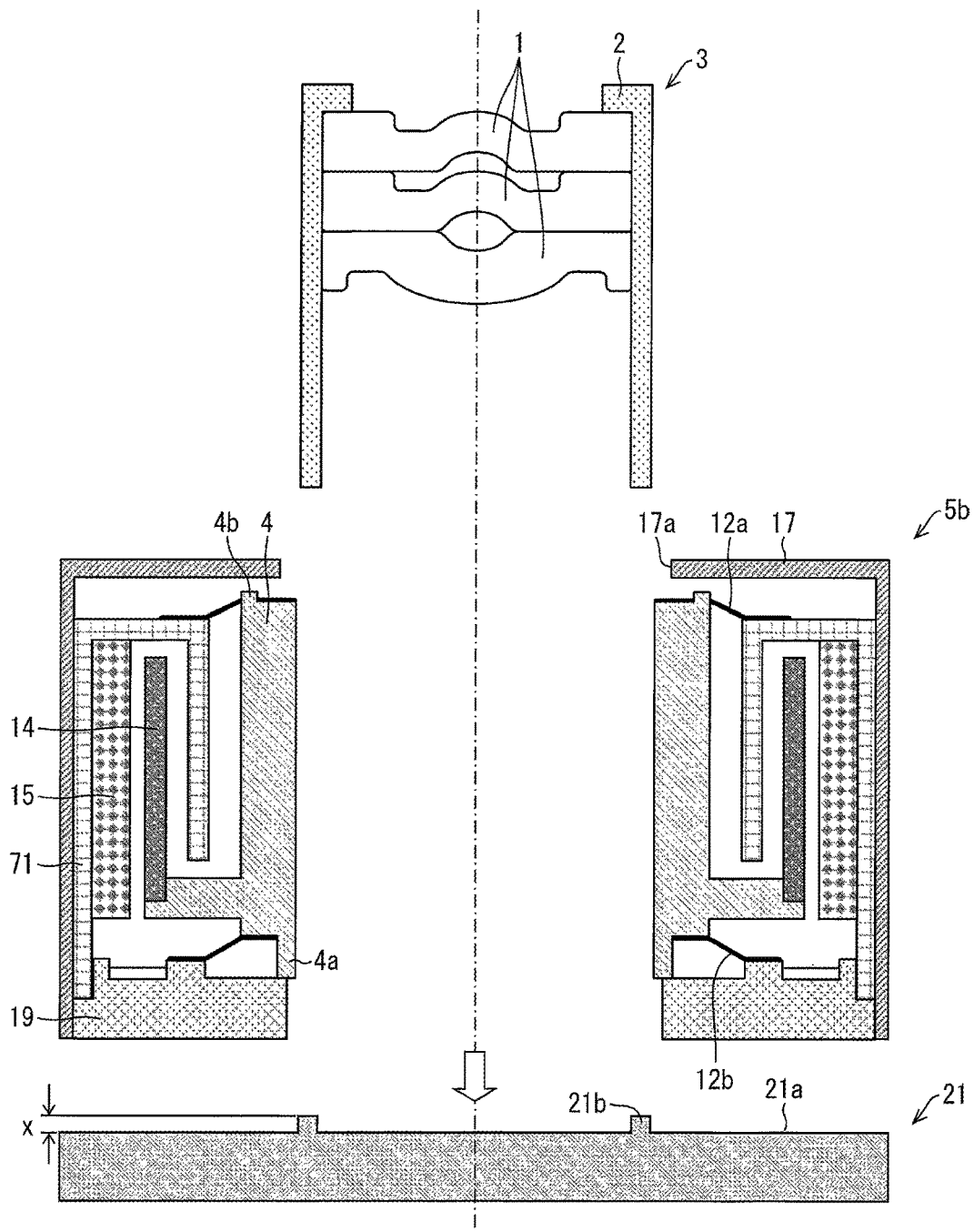
FIG. 14 is a cross-sectional view illustrating a step during a process of producing a camera module of Embodiment 4 which step is a step of preparing a dummy sensor cover as a jig.

With reference to FIG. 14, the description below first deals with a step of (i) preparing an optical section 3, a lens driving device 5b, and a dummy sensor cover 21 and (ii) mounting the lens driving device 5b onto the dummy sensor cover 21.

Specifically, as illustrated in FIG. 14, the method for producing a camera module 70 includes preparing a dummy sensor cover 21 as a jig for the production process. The dummy sensor cover 21 has (i) a flat surface 21a on which the lens driving device 5b is mounted and (ii) an extrusion section 21b extruding from the flat surface 21a. There is a height difference x between the extrusion section 21b and the flat surface 21a, which difference x may simply be set as a gap that prevents the dummy sensor cover 21 from coming into contact with the sensor cover 8', the glass substrate 9', or the like in a case where the lens barrel 2 has been displaced in the direction perpendicular to the optical axis. Typically, a difference x of approximately 5 μm to 10 μm or more can function as a gap. The designed value may be 5 μm or 10 μm. It is desirable to prepare a dummy sensor cover 21 having a difference x as close as possible to the designed value.

Figure 15:
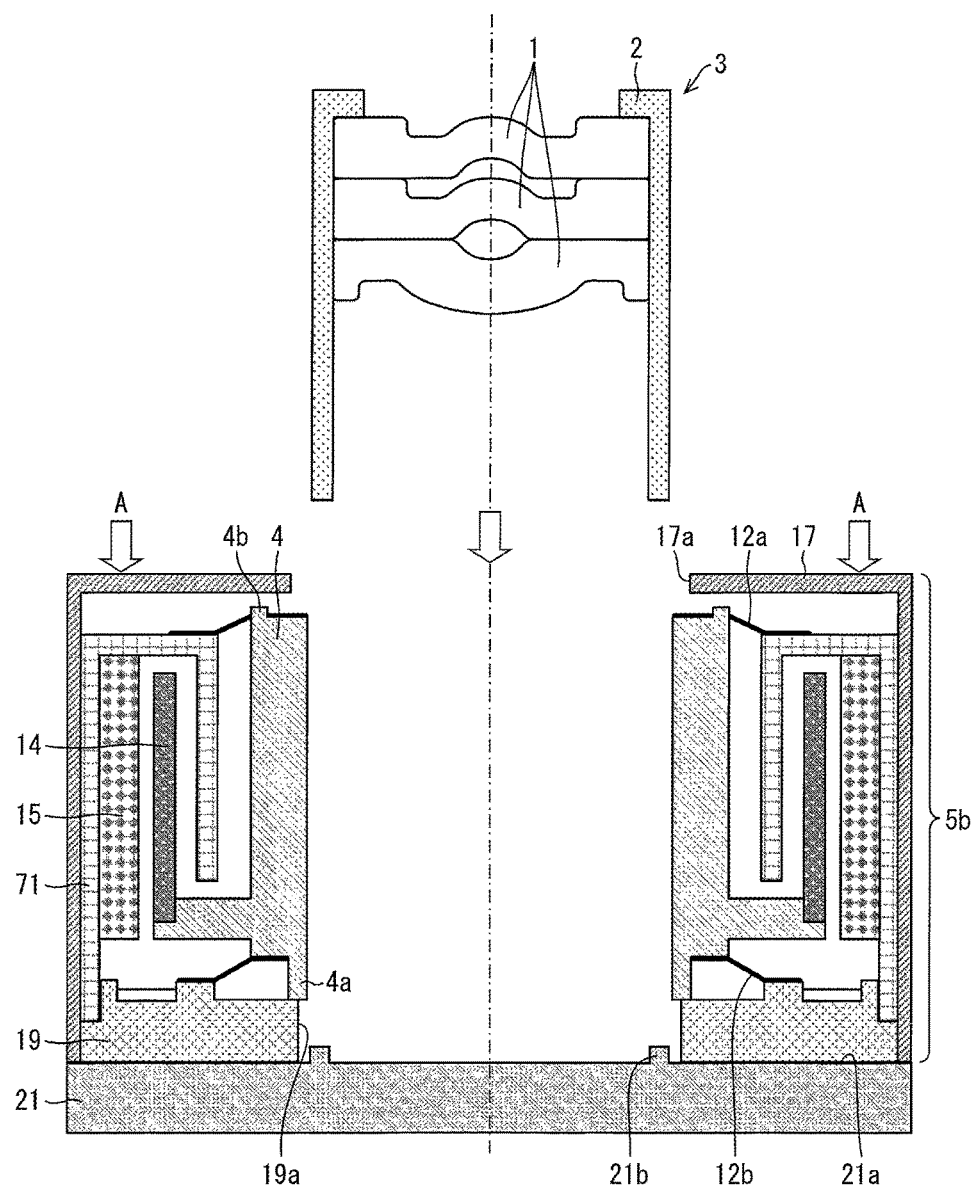
FIG. 15 is a cross-sectional view illustrating a step during a process of producing the camera module of Embodiment 4 and a state where a lens driving device is mounted on a dummy sensor cover.

FIG. 15 is a cross-sectional view illustrating a state where the lens driving device 5b is mounted on the dummy sensor cover 21.

With reference to FIG. 15, the description below deals with a state where the lens driving device 5b is mounted on the dummy sensor cover 21.

The lens driving device 5b is, as illustrated in FIG. 15, mounted on the flat surface 21a of the dummy sensor cover 21. The extrusion section 21b is, as a result, in the opening 19a of the base 19 of the lens driving device 5b.

While the lens driving device 5b is mounted on the flat surface 21a of the dummy sensor cover 21, a pressing pressure is desirably applied in the direction indicated by the arrows A in FIG. 15. A pressing pressure is preferably applied as such for the following reason: The lens barrel 2 needs to be positioned highly accurately with respect to the lower surface of the lens driving device 5b. Thus, if the lens driving device 5b is lifted off from the dummy sensor cover 21, the accuracy will decrease.

Figure 16:
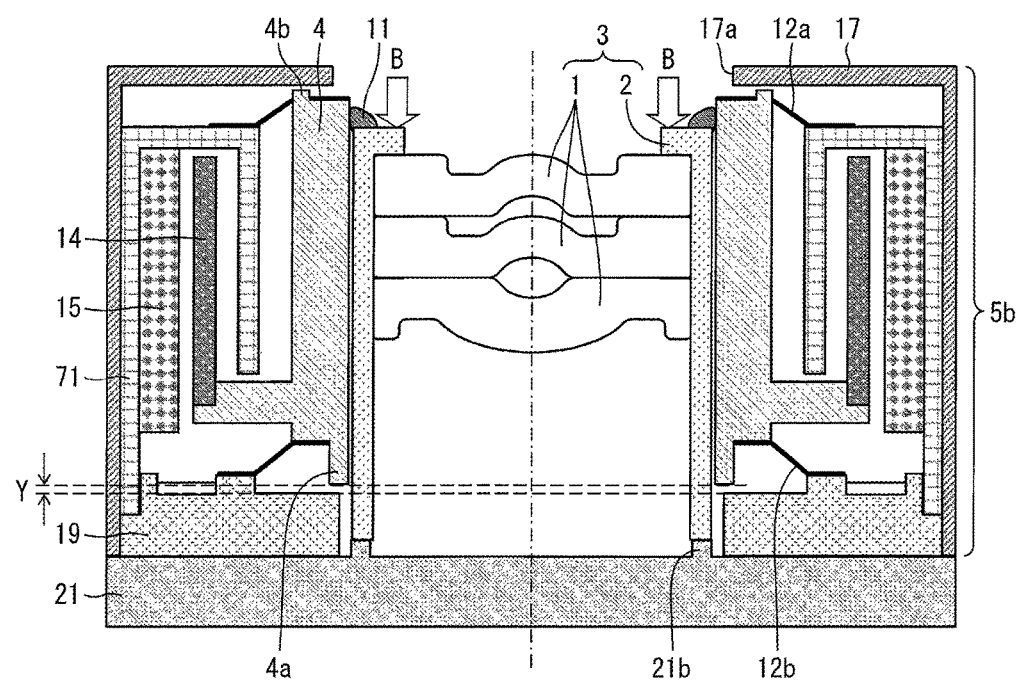
FIG. 16 is a cross-sectional view illustrating a step during a process of producing the camera module of Embodiment 4 and a state where a lens barrel is mounted on a lens driving device in such a manner as to abut on an extrusion section of a dummy sensor cover with a lens holder lifted with use of a current.

FIG. 16 is a cross-sectional view illustrating a state where the lens barrel 2 is mounted in the lens driving device 5b in such a manner as to abut on the extrusion section 21b of the dummy sensor cover 21 with the lens holder 4 lifted with use of a current.

With reference to FIG. 16, the description below deals with a state where the lens barrel 2 (optical section 3) is mounted in the lens driving device 5b in such a manner as to abut on the extrusion section 21b of the dummy sensor cover 21.

As illustrated in FIG. 16, a current is flown through the AF coil 14 of the lens driving device 5b so that the lens holder 4 is lifted by a predetermined amount Y from the base 19. The predetermined amount Y desirably has a value that is not smaller than the assumed amount of two-stage activation. In other words, the predetermined amount Y, by which the lens holder 4 is lifted off from the base 19, desirably has a value that allows the lens holder 4 to be higher than the position at which the lens holder 4 lies when two-stage activation ends. Removing the current causes the lens barrel 2 to become close to the image pickup element 6' by Y. Thus, in order for the amount of over-infinity to be 25 μm with the current removed, the lens barrel 2 has a shape so designed that in the state illustrated in FIG. 16, the image pickup lenses 1 are shifted to the side of the image pickup element 6' by 25 μm—Y from the infinite-distance-side focusing position in a state where the lower end surface of the lens barrel 2 abuts on the extrusion section 21b of the dummy sensor cover 21. Of course, the actual camera module 70 has a tolerance with respect to the designed value. While the lower end surface of the lens barrel 2 abuts on the extrusion section 21b of the dummy sensor cover 21, a pressing pressure is desirably applied in the direction indicated by the arrows B in FIG. 16. The pressing pressure applied to the lens driving device 5b as indicated by the arrows A in FIG. 15 desirably continues to be applied as well. This is for the following reason: Since both the lens barrel 2 and the lens driving device 5b each have a reference position set with each of the lens barrel 2 and the lens driving device 5b abutting on another member, an error occurs if either the lens barrel 2 or the lens driving device 5b is lifted off from the dummy sensor cover 21. The lens barrel 2 is fixed to the lens holder 4 with use of the adhesive 11 in the state where the pressing pressures are applied as above (that is, the lens barrel 2 and the lens driving device 5b are prevented from becoming lifted off from the dummy sensor cover 21).

Specifically, the lens barrel 2 is inserted in the lens holder 4 with the lens holder 4 lifted off from the base 19. With a slight gap between the lens barrel 2 and the lens holder 4, the lens barrel 2 is attached with the accuracy of not the hole of the lens holder 4 but the extrusion section 21b of the dummy sensor cover 21 as a jig. Thus, even in a case where the lens holder 4 (which is lifted off from the base 19) has a tilt, such a tilt does not influence the attachment of the lens barrel 2 because the lens barrel 2 is not attached with the accuracy of the hole of the lens holder 4. The above configuration thus allows the lens barrel to be attached with high accuracy.

In order to minimize the tilt within the practicable range, the amount of over-infinity should be larger than the amount of two-stage activation (that is, the amount of one-side suspension). The description above mentions the amount of over-infinity as being 25 μm. However, if different variations may eliminate over-infinity, the amount of over-infinity may alternatively have the sum of 25 μm and the amount of two-stage activation. It is further desirable to reduce variations so that the amount of over-infinity does not exceed 25 μm even with the amount of two-stage activation added.

FIG. 16 illustrates the lens holder 4 as being lifted off from the base 19 by the predetermined amount Y at both of the left and right sides of FIG. 16. The predetermined amount Y may differ between the left and right sides by approximately several micrometers.

Figure 17:
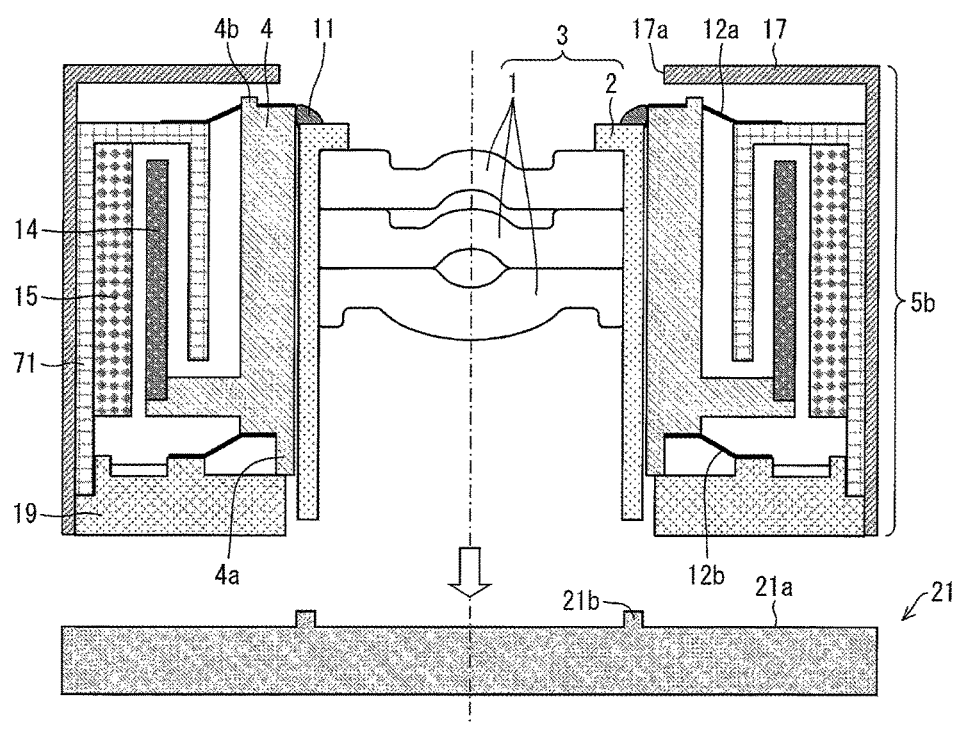
FIG. 17 is a cross-sectional view illustrating a step during a process of producing the camera module of Embodiment 4 and a state where a dummy sensor cover has been detached from a lens driving device.

FIG. 17 is a cross-sectional view illustrating a state where the dummy sensor cover 21 has been detached from the lens driving device 5b.

With reference to FIG. 17, the description below deals with a state where the dummy sensor cover 21 has been detached from the lens driving device 5b.

As illustrated in FIG. 17, the dummy sensor cover 21 serves only as a jig for positioning the lens barrel 2, and is unnecessary after the lens barrel 2 is fixed to the lens holder 4 with use of the adhesive 11. Further, the current flown to lift the lens holder 4 is unnecessary as well after the fixation. Mathematically, in the state illustrated in FIG. 17, the lens barrel 2 is attached at the position of the over-infinity of 25 μm. If two-stage activation is assumed to be 10 μm, the infinite-distance-side focusing position corresponds to a position that lies 15 μm beyond the position at which the two-stage activation ends. The lens barrel 2 is so fixed to the lens holder 4 that the lens holder 4 has a minimum tilt at the above stroke position. The above configuration can thus minimize the tilt that falls within the working range necessary for a camera module.

Figure 18:
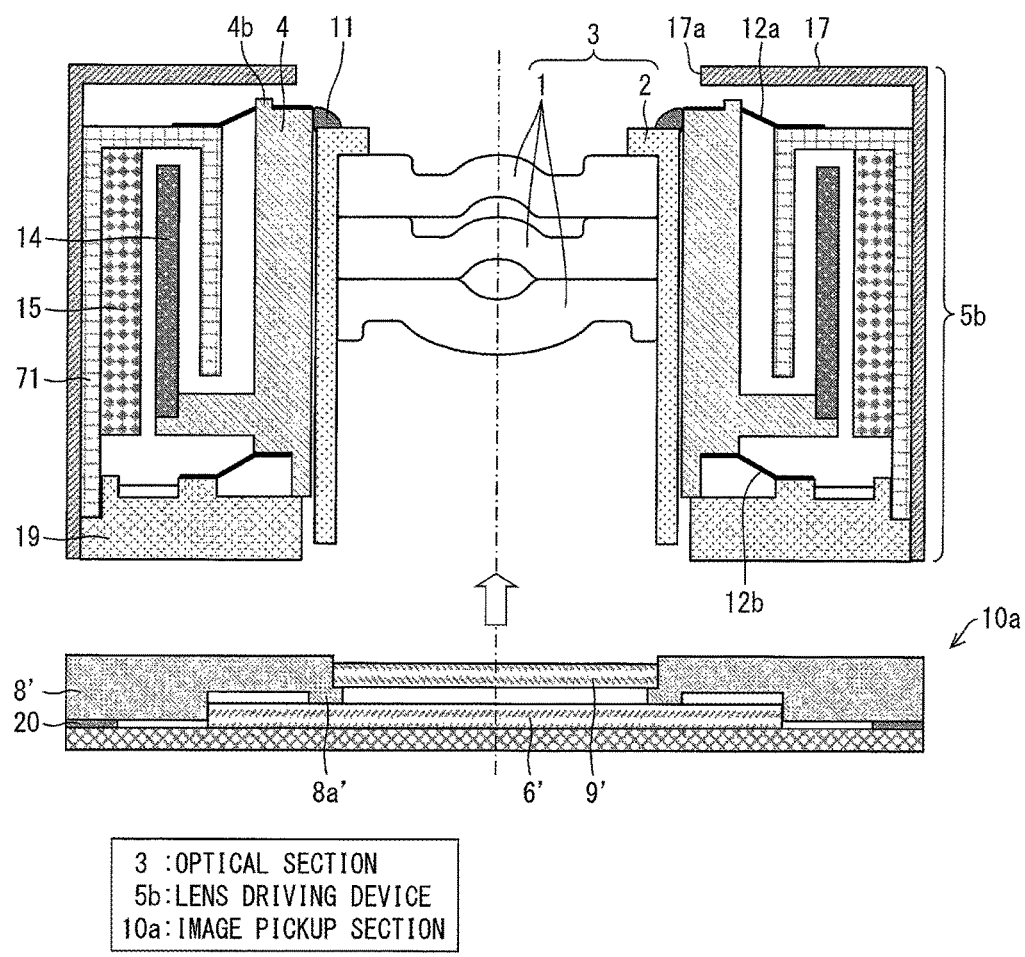
FIG. 18 is a cross-sectional view illustrating a step during a process of producing the camera module of Embodiment 4 which step is a step of replacing a dummy sensor cover with an image pickup section and mounting, onto an image pickup section, a lens driving device including an optical section built therein.

FIG. 18 is a cross-sectional view illustrating a step of (i) replacing the dummy sensor cover 21 with the image pickup section 10*a* and (ii) mounting the lens driving device 5*b* (which includes the optical section 3 built therein) onto the image pickup section 10*a*.

This step is, as illustrated in FIG. 18, a step of joining the image pickup section 10*a* (which includes the image pickup element 6'), instead of the dummy sensor cover 21, to the lens driving device 5*b* (in which the optical section 3 has already been fixed).

Figure 19:
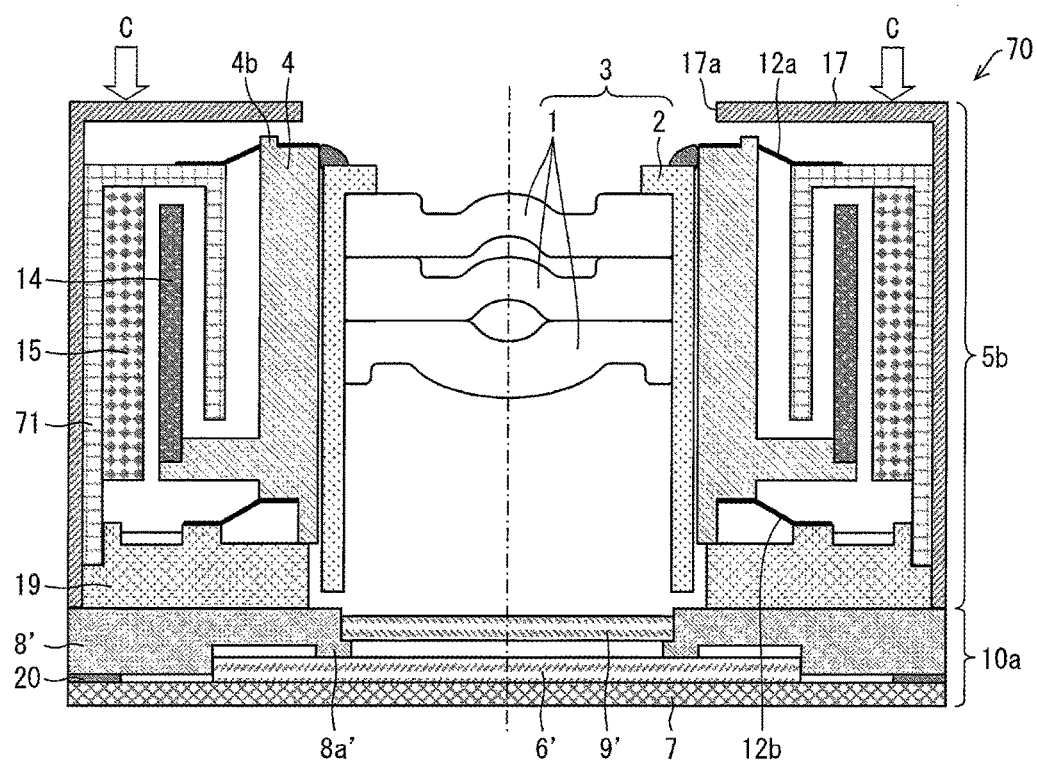
FIG. 19 is a cross-sectional view illustrating a step during a process of producing the camera module of Embodiment 4 and a state where a lens driving device including an optical section built therein is mounted on an image pickup section.

FIG. 19 is a cross-sectional view illustrating a state where the lens driving device 5*b* (which includes the optical section 3 built therein) is mounted on the image pickup section 10*a*.

As illustrated in FIG. 19, the lens driving device 5*b* (which includes the optical section 3 built therein) is mounted onto the upper surface of the sensor cover 8' of the image pickup section 10*a* and is fixed to the upper surface with use of an adhesive (not shown in FIG. 19).

Until the adhesive that bonds the lens driving device 5*b* and the sensor cover 8' to each other becomes hardened to a necessary strength, a pressing pressure is desirably applied in the direction indicated by the arrows C in FIG. 19. With this arrangement, the lens driving device 5*b* will not become lifted off from the upper surface of the sensor cover 8'.

The method described above allows for production of a camera module 70 in which (i) image pickup lenses 1 are positioned highly accurately and (ii) the tilt due to the influence of two-stage activation has been reduced.

Embodiment 5

The description below deals with Embodiment 5 of the present invention with reference to FIGS. 20 and 21. A camera module 80 of the present embodiment differs from Embodiment 1 above in that the camera module 80 includes a lens driving device 5*c* including a base 81 that integrates a base member of the lens driving device with a sensor cover of the lens driving device. Regarding the other aspects of the configuration, the present embodiment is as described about Embodiment 1. For convenience of description, any member of the present embodiment that is identical in function to a corresponding member illustrated in the drawings for Embodiment 1 above is assigned a common reference numeral, and is not described here.

Figure 20:
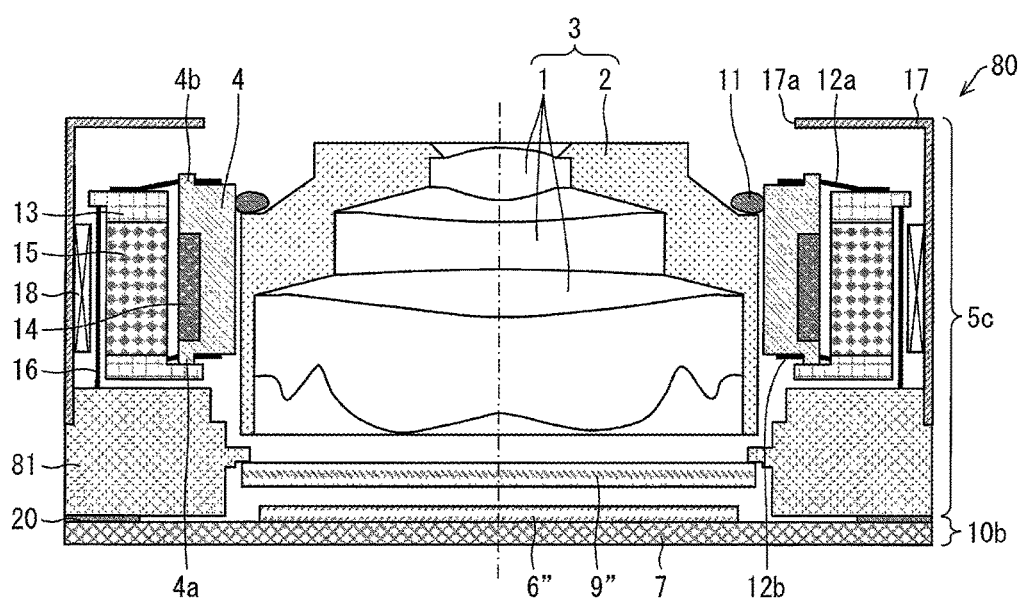
FIG. 20 is a cross-sectional view illustrating a configuration of a camera module in which a base member of a lens driving device and a sensor cover of the lens driving device are integrated with each other.

FIG. 20 is a cross-sectional view of a camera module 80 including a base 81 that integrates a base member of the lens driving device with a sensor cover of the lens driving device, the view illustrating a configuration of the camera module 80.

As illustrated in FIG. 20, the lens driving device 5*c* of the camera module 80 includes a base 81 that integrates a base of the lens driving device with a sensor cover of the lens driving device. The camera module 80 thus includes (i) an image pickup section 10*b* that does not include a sensor cover and (ii) a glass substrate 9" fixed on the side of the base 81 of the lens driving device 5*c*. The image pickup section 10*b* includes only a substrate 7 and an image pickup element 6". The present embodiment thus uses a dummy sensor cover 82 having a structure slightly different from that of the dummy sensor cover 21.

Figure 21:
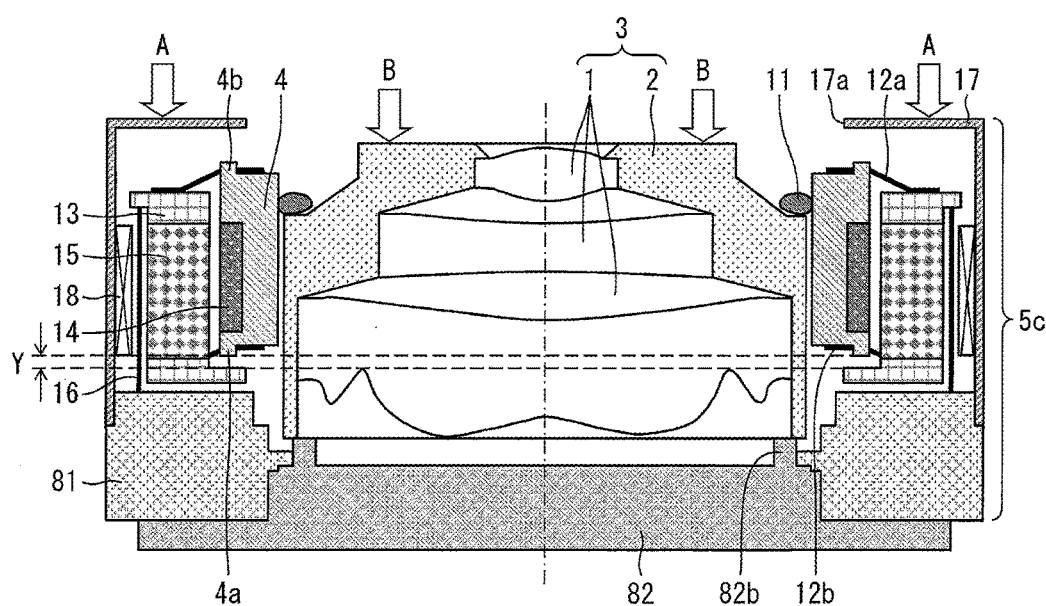
FIG. 21 is a cross-sectional view illustrating a step during a process of producing a camera module of Embodiment 5 and a state where a lens barrel is mounted on a lens driving device in such a manner as to abut on an extrusion section of a dummy sensor cover with a lens holder lifted with use of a current.

FIG. 21 is a cross-sectional view illustrating a state where the lens barrel 2 is mounted in the lens driving device 5*c* in such a manner as to abut on the extrusion section 82*b* of the dummy sensor cover 82 with the lens holder 4 lifted with use of a current.

As illustrated in FIG. 21, the lens holder 4 is lifted off from the intermediate support 13 by means of application of a current through the AF coil 14, and in this state, the lens barrel 2 is positioned with respect to the lens holder 4 and is fixed to the lens holder 4. After the lens barrel 2 is fixed to the lens holder 4, the dummy sensor cover 82 is detached. Then, as illustrated in FIG. 20, the glass substrate 9" is fixed to the base 81 of the lens driving device 5*c* with use of an adhesive. After that, the lens driving device 5*c* is mounted onto the image pickup section 10*b* (which includes only the substrate 7 and the image pickup element 6").

The camera module 80 includes a smaller number of parts than the camera module 50 of Embodiment 1 described above and yet produces the same effects.

FIG. 21 illustrates the lens holder 4 as being lifted off from the intermediate support 13 by the predetermined amount Y at both of the left and right sides of FIG. 21. The predetermined amount Y may differ between the left and right sides by approximately several micrometers.

Embodiment 6

The description below deals with Embodiment 6 of the present invention with reference to FIG. 22. A camera module 90 of the present embodiment differs from Embodiment 4 above in that (i) the lens driving device 5*b* is configured such that in a state where the lens holder 4 is lifted off from the base 19, the lens barrel 2 is positioned and fixed with the lens barrel 2 abutting on the sensor cover 8' and that (ii) the lens barrel is not positioned with use of a jig. Regarding the other aspects of the configuration, the present embodiment is as described about Embodiment 4. For convenience of description, any member of the present embodiment that is identical in function to a corresponding member illustrated in the drawings for Embodiment 4 above is assigned a common reference numeral, and is not described here.

Figure 22:
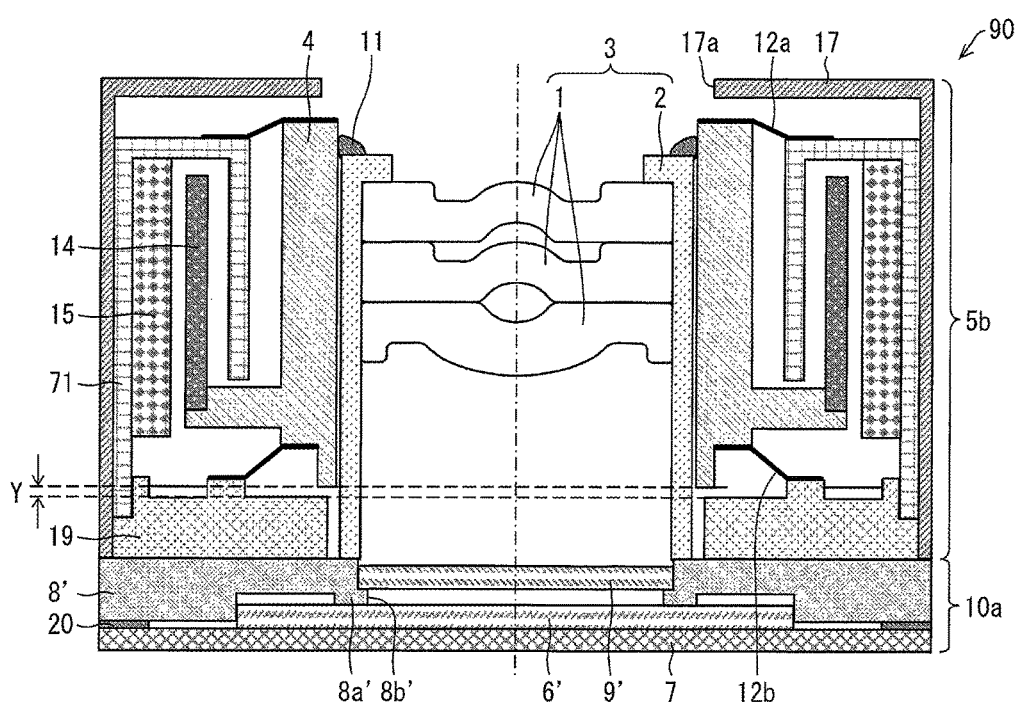
FIG. 22 is a cross-sectional view illustrating a camera module in which an optical section and an image pickup section are positioned and fixed with a lens holder lifted.

FIG. 22 is a central cross-sectional view of a camera module 90.

The camera module 90 includes (i) an image pickup section 10*a*, (ii) an optical section 3 contained in a module cover 17 that has a box shape and that is disposed above the image pickup section 10*a*, and (iii) a lens driving device 5*b* configured to drive the optical section 3.

The lens driving device 5*b* is configured such that the lens holder 4, to which the optical section 3 is fixed with use of an adhesive 11, is supported by two upper and lower AF (autofocus) springs 12*a* and 12*b* movably along the optical axis with respect to a fixing section. The lens holder 4 has an outer periphery portion to which an AF coil 14 is fixed. The fixing section (that is, a fixing section of the lens driving device 5*b*) includes, for example, (i) a yoke 71 configured to hold an AF driving permanent magnet 15, (ii) a base 19, and (iii) a module cover 17. The upper AF spring 12*a* has an end fixed to the yoke 71. The lower AF spring 12*b* has an end fixed to the base 19. The present embodiment differs from Embodiment 4 in that in a state where the lens holder 4 is lifted off from the base 19 by the predetermined amount Y shown in FIG. 22, the lens barrel 2 abuts on the sensor cover 8'.

The camera module 90 of the present embodiment is produced through a process that does not require a dummy sensor cover as a jig. With the lens holder 4 lifted with use of a current, the lens barrel 2 is mounted onto the lens driving device 5b in such a manner as to abut on the upper surface of the sensor cover 8', and is positioned and fixed. Since the lens holder 4 is lifted, there does not occur an initial dynamic tilt at the moment of the lift. Further, the optical section 3 is positioned and fixed with use of the sensor cover 8' as a reference, and is thus mounted onto the image pickup element 6' with a low tilt. The lens holder 4 is lifted off from the base 19 with the lens barrel 2 abutting on the sensor cover 8'. In that state, flowing a current through the coil 14 to move the lens holder 4 does not cause a two-stage activation phenomenon. The present embodiment therefore allows for production of a camera module having only a low tilt.

The present embodiment described here is configured such that the base 19 of the lens driving device 5b and the sensor cover 8' are separate members. The present embodiment is, however, not limited to such a configuration. The present embodiment may alternatively be configured such that, for example, the base 19 and the sensor cover 8' are integrated with each other as with the base 81 of the lens driving device 5c illustrated in FIGS. 20 and 21 for Embodiment 5. In this case, in a state where the lens holder 4 is lifted off from the integrated base, the optical section 3 abuts on the integrated base and is positioned and fixed.

The description above deals with a case of producing a camera module 90 in which case the optical section 3 abuts on part of the image pickup section 10a (for example, the sensor cover 8') and is positioned with respect to the lens holder 4. The present embodiment is, however, not limited to such a case, and may alternatively be configured such that the optical section abuts on the fixing section of the lens driving device and is positioned with respect to the lens holder.

The present embodiment described here uses a method of flowing a current through the coil 14 to drive the lens holder 4 in order to lift the lens holder 4 off from the base 19. The present embodiment is, however, not limited to such a configuration, and may alternatively be configured to include a lens driving device including a lens holder 4 neutrally held by springs 12a and 12b as in Embodiment 3.

Specifically, the present embodiment may be configured such that (i) the lens driving device 5b is driven so that the lens holder 4 is held at an intermediate position (that is, a position within the above movable range at which position the lens holder 4 is away from the movable range limit position on the infinite-distance side and that on the macro side) or that (ii) in a case where the lens holder is at the intermediate position even in a state where the lens driving device is not in operation, the optical section is positioned without the lens driving device being driven.

The present embodiment described here is a camera module having an autofocus function. The present embodiment is, however, not limited to such a camera module. The configuration of the present embodiment may alternatively apply to a camera module having an image stabilizer function. In a case where a camera module having an image stabilizer function is configured as the present embodiment, an optical section (lens holder) abuts on, for example, a sensor cover in a state where no drive current is flown for autofocus. Thus, driving the lens barrel for image stabilization in that state will cause the lens barrel and, for example, the sensor cover to slide on each other, with the result that correct image stabilization cannot be carried out. Carrying an image stabilizer operation requires moving the lens holder with use of an autofocus function before operation, so that the image stabilizer function will be slightly limited.

The method described above allows for production of a camera module 90 in which (i) image pickup lenses 1 are positioned highly accurately and (ii) the tilt due to the influence of two-stage activation has been reduced.

Embodiment 7

The description below deals with Embodiment 7 of the present invention with reference to FIGS. 23 through 26. A camera module 100 of the present embodiment differs from Embodiment 6 above in that the lens driving device 5b is configured such that the lens barrel 2 is positioned and fixed in a state where (i) the lens holder 4 is lifted off from the base 19 and (ii) the lens barrel 2 does not abut on the sensor cover 8' and is lifted. The present embodiment described here is an example case in which the lens barrel 2 is positioned without use of a jig. Embodiment 8 described below is a case where the lens barrel 2 is positioned with use of a jig. Regarding the other aspects of the configuration, the present embodiment is as described about Embodiment 6. For convenience of description, any member of the present embodiment that is identical in function to a corresponding member illustrated in the drawings for Embodiment 6 above is assigned a common reference numeral, and is not described here.

Figure 23:
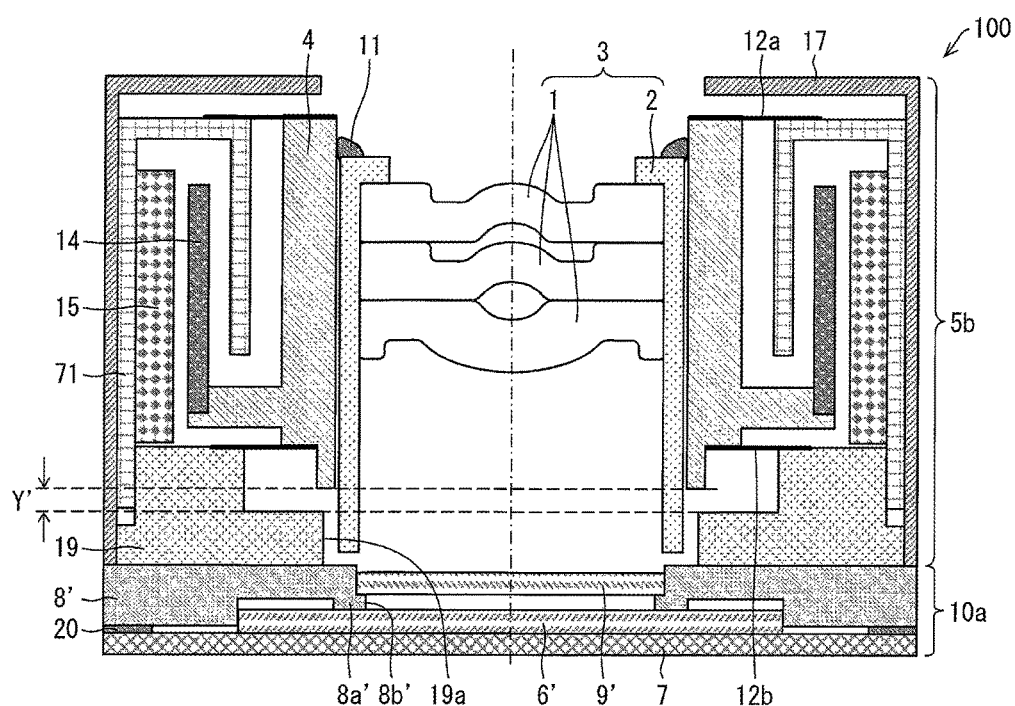
FIG. 23 is a central cross-sectional view of a camera module of Embodiment 7.

FIG. 23 is a central cross-sectional view of a camera module 100.

The camera module 100 includes (i) an image pickup section 10a, (ii) an optical section 3 contained in a module cover 17 that has a box shape and that is disposed above the image pickup section 10a, and (iii) a lens driving device 5b configured to drive the optical section 3.

The lens driving device 5b is configured such that the lens holder 4, to which the optical section 3 is fixed with use of an adhesive 11, is supported by two upper and lower AF (autofocus) springs 12a and 12b movably along the optical axis with respect to a fixing section. The lens holder 4 has an outer periphery portion to which an AF coil 14 is fixed. The fixing section (that is, a fixing section of the lens driving device 5b) includes, for example, (i) a yoke 71 configured to hold an AF driving permanent magnet 15, (ii) a base 19, and (iii) a module cover 17. The upper AF spring 12a has an end fixed to the yoke 71. The lower AF spring 12b has an end fixed to the base 19. The present embodiment differs from Embodiment 6 described above in that in a state where the lens driving device 5b is not driven, (i) the lens holder 4 is supported by the upper and lower AF springs 12a and 12b at an intermediate position within the movable range, (ii) the lens holder 4 is lifted off from the base 19 by the predetermined amount Y' shown in FIG. 23, and (iii) in this state, the lens barrel 2 is also lifted off from the sensor cover 8'. Embodiment 6 described above is configured such that in a state where the lens driving device 5b is not driven, the lens barrel 2 constantly abuts on the sensor cover 8', and thus has a risk of the lens barrel 2 and the lens holder 4, which are fixed to each other with use of an adhesive, becoming detached from each other. The present embodiment is, in contrast, configured such that the lens barrel 2 and the sensor cover 8' do not abut on each other within a practicable stroke range, and thus has a lower risk of the above detachment.

Figure 24:
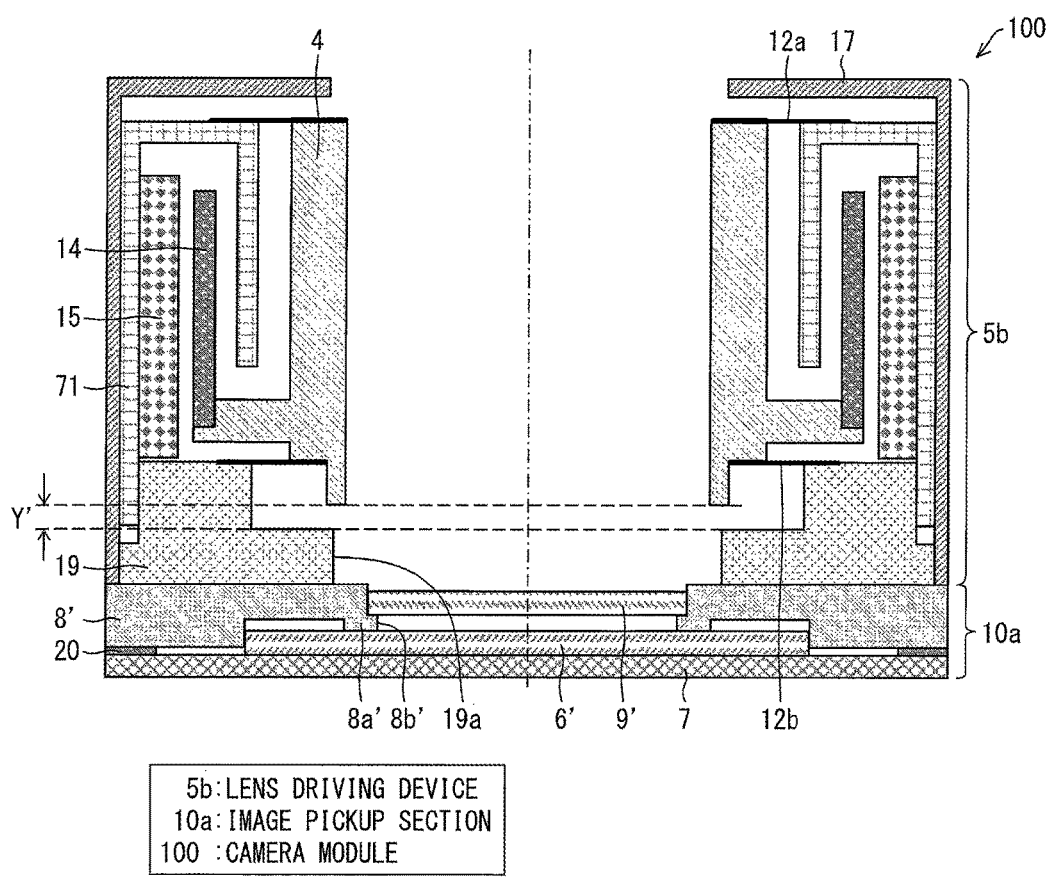
FIG. 24 is a cross-sectional view illustrating a first step during a process of producing the camera module illustrated in FIG. 23 and a state which is prior to the insertion of a lens barrel and in which state a lens driving device is not in operation.
Figure 25:
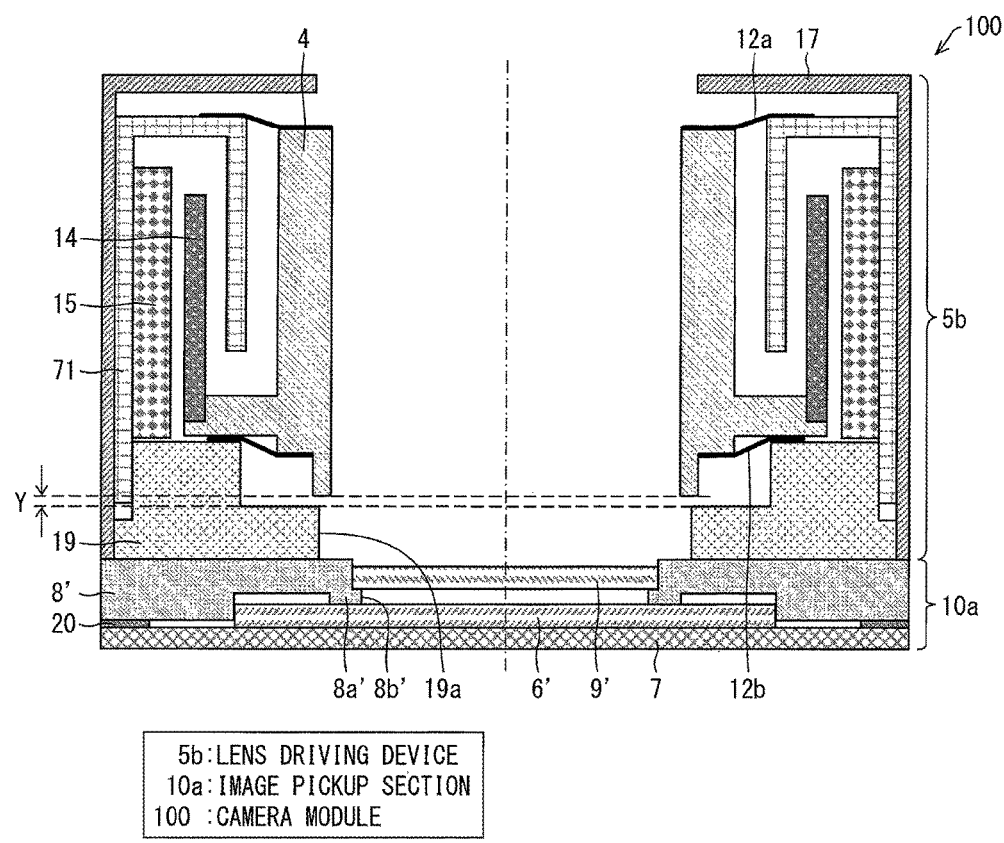
FIG. 25 is a cross-sectional view illustrating a second step during a process of producing the camera module illustrated in FIG. 23 and a state where a current is applied to a coil to displace a lens holder to the side of an image pickup element.
Figure 26:
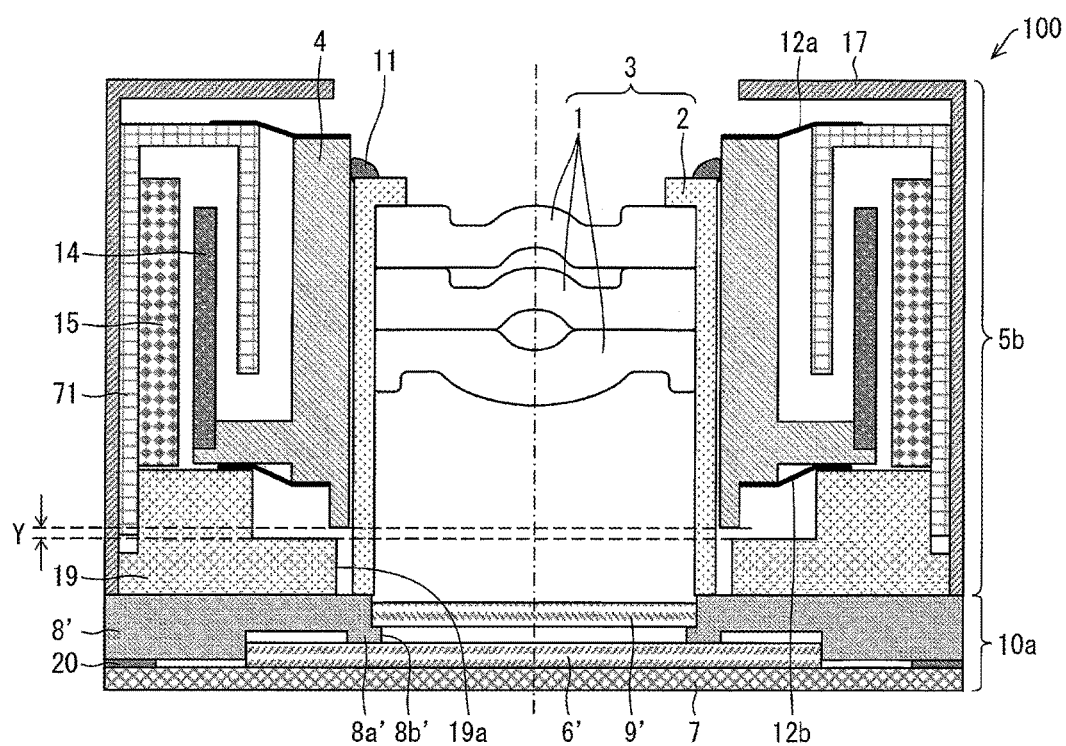
FIG. 26 is a cross-sectional view illustrating a third step during a process of producing the camera module illustrated in FIG. 23 and a state where a lens barrel has been inserted, positioned, and fixed.

With reference to FIGS. 24 through 26, the description below deals with a process of producing a camera module 100 of the present embodiment, specifically, a step of positioning the lens barrel 2 with respect to the lens holder 4 and fixing the lens barrel 2 to the lens holder 4.

FIG. 24 is a diagram illustrating a first step of the process of producing a camera module 100 of the present embodiment.

FIG. 24 illustrates a state of the camera module 100 illustrated in FIG. 23 which state is prior to the insertion of the lens barrel 2 and in which state the lens driving device 5b is not in operation (that is, a current is not flown through the coil 14). As described above, in the state where the lens driving device 5b is not driven, the lens holder 4 does not abut on the base 19 and is lifted by the predetermined amount Y'. Technically, there is a very small difference between the predetermined amount Y' shown in FIG. 23 and the predetermined amount Y' shown in FIG. 24 due to the weight of the lens barrel 2. The description below, however, assumes that the two predetermined amounts Y' are equal to each other.

FIG. 25 is a diagram illustrating a second step of the process of producing a camera module 100 of the present embodiment.

The second step illustrated in FIG. 25 is a step of flowing a current through the coil 14 to displace the lens holder 4 to the side of the image pickup element and decrease the gap between the lens holder 4 and the base 19 from Y' to Y. Y is desirably small, but is not zero. This is to reduce the tilt due to the influence of two-stage activation as with the other embodiments.

FIG. 26 is a diagram illustrating a third step of (i) inserting the lens barrel 2 in the state illustrated in FIG. 25, (ii) positioning the lens barrel 2 so that the lens barrel 2 has a lower end abutting on the sensor cover 8', and (iii) fixing the lens holder 4 and the lens barrel 2 to each other with use of the adhesive 11.

Through the third step, after the lens barrel 2 is positioned and fixed, removing the current flown through the coil 14 achieves the state illustrated in FIG. 23, so that the gap between the lens holder 4 and the base 19 returns to Y'.

The present embodiment described here is configured such that the base 19 of the lens driving device 5b and the sensor cover 8' are separate members. The present embodiment is, however, not limited to such a configuration. The present embodiment may alternatively be configured such that, for example, the base 19 and the sensor cover 8' are integrated with each other as with the base 81 of the lens driving device 5c illustrated in FIGS. 20 and 21 for Embodiment 5. In this case, in a state where the lens holder 4 is lifted off from the integrated base, the optical section 3 abuts on the integrated base and is positioned and fixed.

The description above deals with a case of producing a camera module 100 in which case the optical section 3 abuts on part of the image pickup section 10a (for example, the sensor cover 8') and is positioned with respect to the lens holder 4. The present embodiment is, however, not limited to such a case, and may alternatively be configured such that the optical section abuts on the fixing section of the lens driving device and is positioned with respect to the lens holder.

The present embodiment described here is a camera module having an autofocus function. The present embodiment is, however, not limited to such a camera module. The configuration of the present embodiment may alternatively apply to a camera module having an image stabilizer function. Even in a case where a camera module having an image stabilizer function is configured as the present embodiment, with the stroke position of the lens holder in practical use, the lens holder 4 does not abut on the base 19, and the lens barrel 2 does not abut on the sensor cover 8' either. The configuration of the present embodiment therefore does not hinder the image stabilizer operation.

Embodiment 8

The description below deals with Embodiment 8 of the present invention with reference to FIG. 27. A camera module 100 of the present embodiment differs from Embodiment 7 above in that the lens barrel 2 is positioned with use of a dummy sensor cover 21 as a jig for positioning the lens barrel 2. Regarding the other aspects of the configuration, the present embodiment is as described about Embodiment 7. For convenience of description, any member of the present embodiment that is identical in function to a corresponding member illustrated in the drawings for Embodiment 7 above is assigned a common reference numeral, and is not described here.

Figure 27:
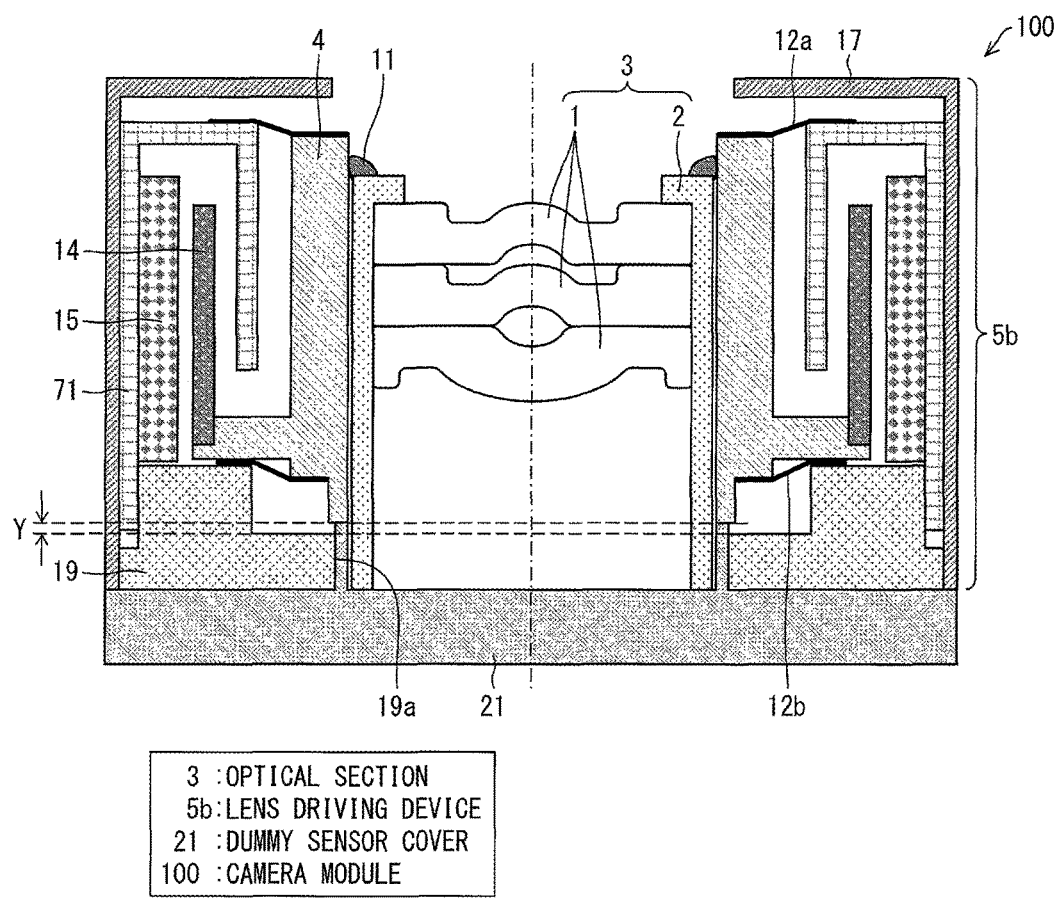
FIG. 27 is a diagram illustrating an example step of positioning a lens barrel with use of a dummy sensor cover as a jig to produce the camera module illustrated in FIG. 23.
Figure 28:
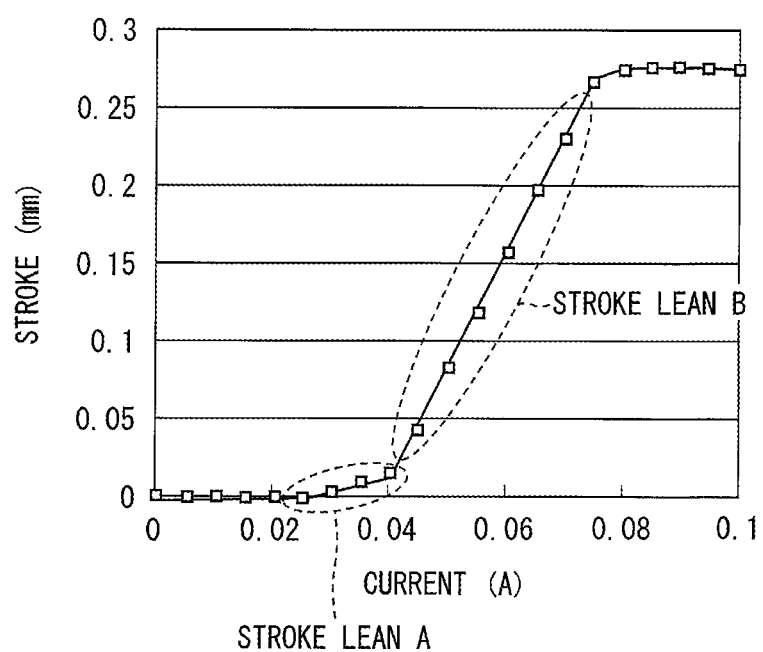
FIG. 28 is a graph illustrating a problem with the stroke characteristic of a conventional camera module.
Figure 29:
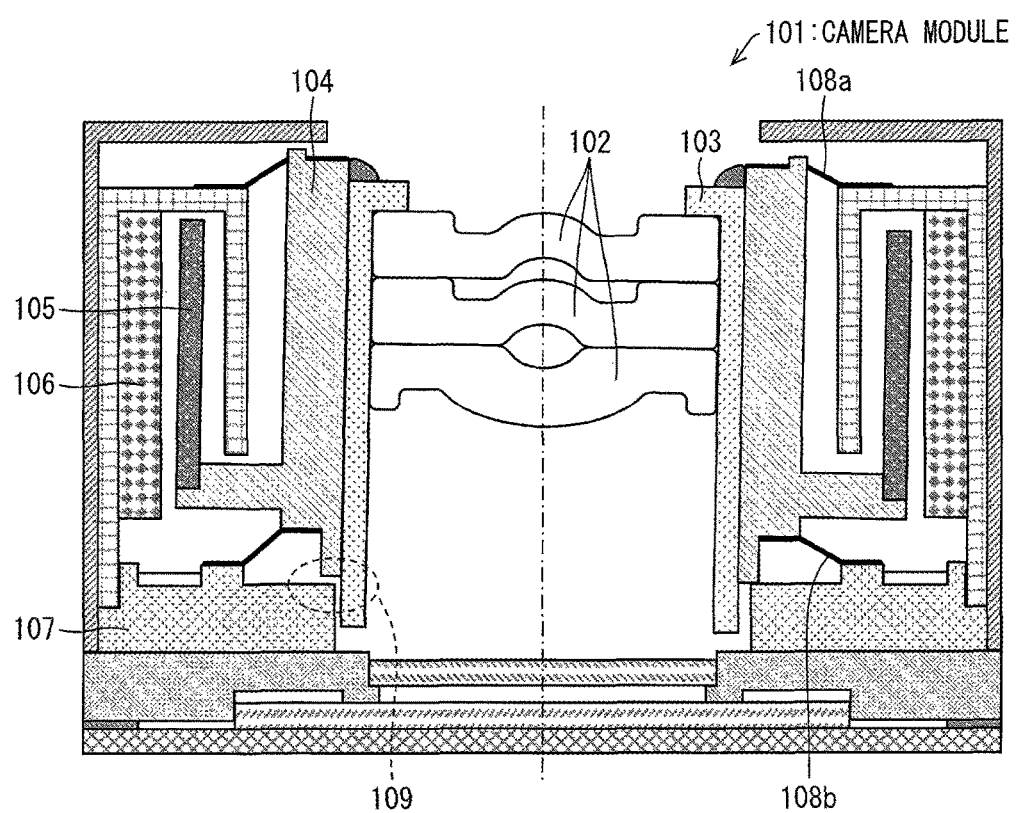
FIG. 29 is a cross-sectional view of a conventional camera module, the view illustrating a configuration of the camera module.

FIG. 27 is a diagram illustrating an example step of positioning the lens barrel 2 with use of a dummy sensor cover 21 as a jig during a process of producing a camera module 100.

As illustrated in FIG. 27, the lens barrel 2 and the lens holder 4 may simply be fixed to each other with use of (i) an adhesive and (ii) a dummy sensor cover 21 instead of the sensor cover 8' so that the lens barrel 2 and the lens holder 4 will have a positional relationship equivalent to that illustrated in FIG. 26. Then, the dummy sensor cover 21 is detached, and instead the image pickup section 10a illustrated in FIG. 23 is attached to the lens driving device 5b. This produces a camera module 100.

The method described above allows for production of a camera module 100 in which (i) image pickup lenses 1 are positioned highly accurately and (ii) the tilt due to the influence of two-stage activation has been reduced.

[Recap]

A method of a first aspect of the present invention for producing a camera module is a method for producing a camera module, the camera module including: an optical section including a plurality of image pickup lenses; a lens driving device including: a lens holder configured to hold the optical section; and a movable range limiting section configured to limit a movable range for the lens holder on an infinite-distance side and a macro side, the lens driving device being configured to drive the optical section and the lens holder integrally at least along an optical axis of the plurality of image pickup lenses; and an image pickup section including an image pickup element, the image pickup section being disposed on the infinite-distance side (that is, the lower side) of the optical section and the lens driving device, the method including: a first step of positioning the optical section with respect to the lens holder with use of a jig while sliding the optical section on the lens holder in a state where the lens holder is at an intermediate position within the movable range (that is, a position within the above movable range at which position the lens holder is away from the movable range limit position on the infinite-distance side and that on the macro side); and a second step of fixing the optical section to the lens holder at a position at which the optical section has been positioned through the first step.

With the above method, the optical section is positioned in a state where the lens holder is at an intermediate position within the movable range which intermediate position is away from the movable range limit position on the infinite-distance side and that on the macro side. This makes it possible to reduce the influence of a tilt of the lens holder in the vicinity of the infinite-distance side mechanical end.

With the above method, in the state where the lens holder is at the intermediate position, the optical section is positioned and fixed with use of a jig while the optical section is being slid on the lens holder. Thus, even in a case where the lens holder at the intermediate position is tilted, the optical section can be positioned with the accuracy of a jig without being influenced by the tilt. This makes it possible to reduce the influence of a tilt of the lens holder at an intermediate position away from the infinite-distance side mechanical end and the macro side.

A method of a second aspect of the present invention for producing a camera module is a method for producing a camera module, the camera module including: an optical section including a plurality of image pickup lenses; a lens driving device including: a lens holder configured to hold the optical section; and a movable range limiting section configured to limit a movable range for the lens holder on an infinite-distance side and a macro side, the lens driving device being configured to drive the optical section and the lens holder integrally at least along an optical axis of the plurality of image pickup lenses; and an image pickup section including an image pickup element, the image pickup section being disposed on the infinite-distance side of the optical section and the lens driving device, the method including: a first step of positioning the optical section with respect to the lens holder by causing the optical section to abut on either a fixing section of the lens driving device or part of the image pickup section in a state where the lens holder is at an intermediate position within the movable range; and a second step of fixing the optical section to the lens holder at a position at which the optical section has been positioned through the first step.

With the above method, even in a case where the optical section is positioned not with use of a jig but by being caused to abut on a fixing section of the lens driving device or part of the image pickup section, the optical section is positioned with respect to the lens holder in the state where the lens holder is at an intermediate position within the movable range (that is, a position within the above movable range at which position the lens holder is away from the movable range limit position on the infinite-distance side and that on the macro side). This makes it possible to reduce the influence of a tilt in the vicinity of the infinite-distance side mechanical end.

A method of a third aspect of the present invention for producing a camera module is a method in which the lens holder is at the intermediate position in a state where the lens driving device is not in operation; and the first step positions the optical section without driving the lens driving device.

The above method allows the lens holder to be held at the intermediate position without the lens driving device being operated. The above method thus makes it possible to produce a camera module with a reduced tilt even in a state where the lens driving device is not in operation.

A method of a fourth aspect of the present invention for producing a camera module is a method in which during the first step, the lens driving device is driven so that the lens holder is held at the intermediate position.

The above method allows the optical section to be fixed to the lens holder without being influenced by a tilt of the lens holder which tilt occurs in the vicinity of the infinite-distance side mechanical end (that is, in the vicinity of the position of activation), at which a tilt tends to be particularly large in operation. The above method thus makes it possible to produce a camera module with a reduced tilt.

A method of a fifth aspect of the present invention for producing a camera module is a method in which the lens holder is at the intermediate position in a state where the lens driving device is not in operation; and the first step positions the optical section by driving the lens driving device so that the lens holder is displaced to a vicinity of a limit of the movable range on the infinite-distance side within the intermediate position.

With the above method, the optical section (for example, the lens barrel) does not abut on the image pickup section (for example, the sensor cover) in a normal state. This makes it possible to reduce the risk of the lens holder and the optical section (for example, the lens barrel), which are fixed to each other with use of an adhesive, becoming detached from each other. The above method further allows the optical section to be fixed to the lens holder in such a manner as not to be influenced by a tilt of the lens holder which tilt occurs in the vicinity of the position of activation. The above method thus makes it possible to produce a camera module with a reduced tilt.

A method of a sixth aspect of the present invention for producing a camera module is a method further including a third step of placing the image pickup section on the infinite-distance side of the optical section and the lens driving device, wherein the third step is carried out after the first step and the second step.

With the above method, the third step is carried out after the first step and the second step. Thus, the image pickup section is placed on the infinite-distance side of the optical section and the lens driving device after the optical section is fixed to the lens holder of the lens driving device.

This means that the image pickup section is absent during the first step. The above method thus allows the optical section to be positioned while a uniform distance is assumed between the optical section and the image pickup element of the image pickup section. This in turn makes it possible to shorten the time period necessary for the optical section to be positioned.

A method of a seventh aspect of the present invention for producing a camera module is a method further including a third step of placing the image pickup section on the infinite-distance side of the optical section and the lens driving device, wherein the third step is carried out before the first step and the second step.

With the above method, the third step is carried out before the first step and the second step. Thus, the image pickup section is placed on the infinite-distance side of the optical section and the lens driving device before the optical section is fixed to the lens holder of the lens driving device.

This means that the image pickup section is present during the first step. The above method thus allows the optical section to be positioned while a fine adjustment is made of the distance between the optical section and the image pickup element of the image pickup section. This in turn makes it possible to reduce the amount of over-infinity.

A method of an eighth aspect of the present invention for producing a camera module is a method in which the jig is a dummy image pickup section provided with a protrusion configured to separate the dummy image pickup section from the optical section by a predetermined distance; the first step involves use of the dummy image pickup section so that the optical section is positioned with respect to the lens holder in a state where the optical section abuts on the protrusion; and the third step involves use of the image pickup section instead of the dummy image pickup section.

With the above method, the dummy image pickup section is used as a jig. This eliminates the need for a complicated device.

A method of a ninth aspect of the present invention for producing a camera module is a method in which the jig is a height adjusting device configured to, while gripping the optical section with use of a grip section, slide the optical section on the lens holder so that the optical section is positioned; and during the first step, the height adjusting device adjusts a distance between the image pickup element of the image pickup section and the optical section.

The above method makes it possible to position the optical section while finely adjusting the distance between the optical section and the image pickup element of the image pickup section with use of the height adjusting device during the first step. This in turn makes it possible to reduce the amount of over-infinity.

A camera module of a tenth aspect of the present invention is a camera module including: an optical section including a plurality of image pickup lenses; a lens driving device including: a lens holder configured to hold the optical section; and a movable range limiting section configured to limit a movable range for the lens holder on an infinite-distance side and a macro side, the lens driving device being configured to drive the optical section and the lens holder integrally at least along an optical axis of the plurality of image pickup lenses; and an image pickup section including an image pickup element, the image pickup section being disposed on the infinite-distance side of the optical section and the lens driving device, the optical section being fixed to the lens holder in a state where the lens holder is at an intermediate position within the movable range.

With the above configuration, the optical section is fixed to the lens holder in a state where the lens holder is at an intermediate position within the movable range. This makes it possible to reduce the influence of a tilt in the vicinity of the infinite-distance side mechanical end.

A camera module of an eleventh aspect of the present invention is configured such that the optical section is fixed to the lens holder in such a manner that the optical section does not come into contact with the image pickup section in a case where the lens holder is driven within the movable range.

With the above configuration, the optical section is fixed to the lens holder so that the lens holder will not come into contact with the image pickup section in a case where the lens holder is driven within the movable range. In other words, since the optical section is positioned with respect to the image pickup section and fixed to the image pickup section, it is possible to reduce the influence of a tilt of the lens holder at an intermediate position away from the infinite-distance side mechanical end and the macro side.

A camera module of a twelfth aspect of the present invention is configured such that the optical section is fixed to the lens holder in such a manner that the lens holder does not come into contact with either a fixing section of the lens driving device or the image pickup section in a case (state) where the lens holder is driven within the movable range so that the optical section abuts on either the fixing section of the lens driving device or the image pickup section.

With the above configuration, the optical section is fixed to the lens holder in a state where the lens holder is at an intermediate position within the movable range. This makes it possible to reduce the influence of a tilt in the vicinity of the infinite-distance side mechanical end.

A camera module of a thirteenth aspect of the present invention is configured such that the lens holder is at the intermediate position in a state where the lens driving device is not in operation.

The above configuration allows the optical section to be fixed to the lens holder without the lens driving device being operated.

A camera module of a fourteenth aspect of the present invention is configured such that the lens holder is held at the intermediate position through an operation of the lens driving device.

The above configuration allows the optical section to be fixed to the lens holder without being influenced by a tilt of the lens holder which tilt occurs in the vicinity of the infinite-distance side mechanical end (that is, in the vicinity of the position of activation), at which a tilt tends to be particularly large in operation.

A camera module of a fifteenth aspect of the present invention is configured such that the lens holder is held at the intermediate position by a spring force and a force generated by a current.

The lens holder can be positioned at an intermediate position through, for example, a combinational use of (i) a section configured to lift the lens holder by a spring force and (ii) a section configured to lift the lens holder by flowing a current as described above. As a practical example, the lens holder can be displaced by flowing a current in such a direction as to reduce the amount by which the lens holder has been lifted by a spring force. This minimizes the amount of lift and reliably provides a necessary amount.

The above configuration allows the optical section to be fixed to the lens holder without being influenced by a tilt of the lens holder which tilt occurs in the vicinity of the infinite-distance side mechanical end (that is, in the vicinity of the position of activation), at which a tilt tends to be large in operation.

The present invention is not limited to the description of the embodiments above, but may be altered by a skilled person within the scope of the claims. Any embodiment based on a proper combination of technical means disclosed in different embodiments is also encompassed in the technical scope of the present invention. Further, a new technical feature can be achieved by combining technical means disclosed in different embodiments.

INDUSTRIAL APPLICABILITY

The present invention is suitably applicable particularly to a camera module mounted in any of various electronic devices such as communication devices (for example, portable terminals) and to a method for producing a camera module. The present invention is also applicable to a camera module having an autofocus function and an image stabilizer function.

REFERENCE SIGNS LIST 1 image pickup lens
2 lens barrel
2a maximum outer diameter portion
3 optical section
4 lens holder
4a protrusion
4b protrusion
5 lens driving device
5a lens driving device
5b lens driving device
5c lens driving device
6 image pickup element
6' image pickup element
6" image pickup element 7 substrate
8 sensor cover
8' sensor cover
8" sensor cover
8a projection
8a' projection
8b opening
8b' opening
9 glass substrate
9' glass substrate
9" glass substrate
10 image pickup section
10a image pickup section
10b image pickup section
11 adhesive
12a AF spring
12b AF spring
12c AF spring
12d AF spring
13 intermediate support
14 AF coil
15 permanent magnet
16 suspension wire
17 module cover
17a aperture section
18 OIS coil
19 base
19a opening
20 adhesive
21 dummy sensor cover (jig)
21a flat surface
21b extrusion section
30 height adjusting device (jig)
31 mount
32 arm section
32a grip section
33 support spring
50 camera module
60 camera module
70 camera module
71 yoke
80 camera module
81 base
82 dummy sensor cover (jig)
90 camera module
100 camera module
S reference surface

The invention claimed is:

1. A method for producing a camera module, the camera module including:
an optical section including a plurality of image pickup lenses;
a lens driving device including:
a base;
an intermediate support that is supported by suspension wires with respect to the base movably in a biaxial direction perpendicular to a direction of an optical axis of the plurality of image pickup lenses;
a lens holder configured to hold the optical section;
a protrusion on an infinite-distance side of the lens holder, the protrusion serving as a movable range limiting section configured to limit,
in the direction of the optical axis of the plurality of image pickup lenses,
a movable range for the lens holder on the infinite-distance side respect to the intermediate support; and
a protrusion on a macro side of the lens holder, the protrusion serving as a movable range limiting section configured to limit,
in the direction of the optical axis of the plurality of image pickup lenses,
a movable range for the lens holder on the macro side with respect to the intermediate support,
the lens driving device being configured to drive the optical section and the lens holder integrally at least along the optical axis of the plurality of image pickup lenses; and
an image pickup section including an image pickup element,
the image pickup section being disposed on the infinite-distance side of the optical section and the lens driving device,
the method comprising:
a first step of positioning the optical section with respect to the lens holder with use of a dummy sensor cover while sliding the optical section on the lens holder in a state where the lens holder is spaced from the intermediate support and where the lens holder is at an intermediate position within the movable range which intermediate position is away from a movable range limit position on the infinite-distance side and from a movable range limit position on the macro side; and
a second step of fixing the optical section to the lens holder at a position at which the optical section has been positioned through the first step.

2. The method according to claim 1,
wherein:
the lens holder is at the intermediate position in a state where the lens driving device is not in operation; and
the first step positions the optical section without driving the lens driving device.

3. The method according to claim 1,
wherein:
during the first step, the lens driving device is driven so that the lens holder is held at the intermediate position.

4. The method according to claim 2,
wherein:
the lens holder is at the intermediate position in a state where the lens driving device is not in operation; and
the first step positions the optical section by driving the lens driving device so that the lens holder is displaced to a vicinity of a limit of the movable range on the infinite-distance side within the intermediate position.

5. The method according to claim 1, further comprising:
a third step of placing the image pickup section on the infinite-distance side of the optical section and the lens driving device,
wherein:
the third step is carried out after the first step and the second step.

6. The method according to claim 5,
wherein:
the dummy sensor cover is provided with a protrusion configured to separate the dummy sensor cover from the optical section by a predetermined distance;
the first step involves use of the dummy sensor cover so that the optical section is positioned with respect to the lens holder in a state where the optical section abuts on the protrusion; and
the third step involves use of the dummy sensor cover instead of the dummy image pickup section.

7. A method for producing a camera module,
the camera module including:
an optical section including a plurality of image pickup lenses;
a lens driving device including:
a base;
a lens holder configured to hold the optical section;
a protrusion on an infinite-side of the lens holder,
the protrusion serving as a movable range limiting section configured to limit,
in a direction of an optical axis of the plurality of image pickup lenses,
a movable range for the lens holder on the infinite-distance side and a macro side with respect to the base; and
a protrusion on a macro side of the lens holder,
the protrusion serving as a movable range limiting section configured to limit,
in a direction of an optical axis of the plurality of image pickup lenses,
a movable range for the lens holder on the macro side with respect to the base,
the lens driving device being configured to drive the optical section and the lens holder integrally at least along the optical axis of the plurality of image pickup lenses; and
an image pickup section including an image pickup element,
the image pickup section being disposed on the infinite-distance side of the optical section and the lens driving device,
the method comprising:
a first step of positioning the optical section with respect to the lens holder with use of a dummy sensor cover while sliding the optical section on the lens holder in a state where the lens holder is spaced from base and where the lens holder is at an intermediate position within the movable range which intermediate position is away from a movable range limit position on the infinite-distance side and from a movable range limit position on the macro side; and
a second step of fixing the optical section to the lens holder at a position at which the optical section has been positioned through the first step.

* * * * *